(12) United States Patent
Zhang et al.

(10) Patent No.: US 10,828,608 B2
(45) Date of Patent: Nov. 10, 2020

(54) SEMIPERMEABLE MEMBRANE AND PREPARATION METHOD THEREOF

(71) Applicant: Zhejiang University, Hangzhou (CN)

(72) Inventors: Lin Zhang, Hangzhou (CN); Zhe Tan, Hangzhou (CN); Shengfu Chen, Hangzhou (CN); Lida Meng, Hangzhou (CN)

(73) Assignee: Zhejiang University, Hangzhou (CN)

( * ) Notice: Subject to any disclaimer, the term of this patent is extended or adjusted under 35 U.S.C. 154(b) by 15 days.

(21) Appl. No.: 16/269,669

(22) Filed: Feb. 7, 2019

(65) Prior Publication Data

US 2019/0282967 A1 Sep. 19, 2019

(30) Foreign Application Priority Data

Feb. 7, 2018 (CN) .......................... 2018 1 0120316

(51) Int. Cl.
*B01D 67/00* (2006.01)
*B01D 69/10* (2006.01)
(Continued)

(52) U.S. Cl.
CPC ..... *B01D 67/0006* (2013.01); *B01D 67/0002* (2013.01); *B01D 67/0079* (2013.01);
(Continued)

(58) Field of Classification Search
CPC ............ B01D 67/0002; B01D 67/0006; B01D 67/0079; B01D 69/02; B01D 69/10; B01D 69/125; B01D 69/148; B01D 61/02; B01D 61/027; B01D 71/54; B01D 71/56; B01D 71/60; B01D 2323/30; B01D 2323/40; B01D 2325/08; B01D 2325/20; C02F 1/44
See application file for complete search history.

(56) References Cited

U.S. PATENT DOCUMENTS 4,277,344 A 7/1981 Cadotte
4,769,148 A 9/1988 Fibiger et al.
(Continued)

FOREIGN PATENT DOCUMENTS

CN 1158274 A 9/1997
CN 101820983 A 9/2010

OTHER PUBLICATIONS

Geise, Geoffrey M., et al. Water permeability and water/salt selectivity tradeoff in polymers for desalination. Journal of Membrane Science 369.1-2 (2011): 130-138.
(Continued)

*Primary Examiner* — John Kim
(74) *Attorney, Agent, or Firm* — Zhihua Han; Wen IP LLC

(57) ABSTRACT

Disclosed is a semipermeable membrane and its preparation method. The semipermeable membrane obtained has a Turing structure. The Turing structure is an ordered pattern composed of microstructures. The existence of the structure enables the semipermeable membrane of this invention to have both high water permeation flux and excellent salt retention performance, which breaks the flux limit value of the semipermeable membrane while ensuring high selective permeability of the membrane. It also has good anti-pollution properties. The preparation method of the invention can be easily integrated into the existing semipermeable membrane production line without further cost input which has far-reaching practical significance and commercial value.

16 Claims, 16 Drawing Sheets

(51) Int. Cl.
 *B01D 69/12* (2006.01)
 *B01D 71/56* (2006.01)
 *B01D 71/60* (2006.01)
 *B01D 69/14* (2006.01)
 *C02F 1/44* (2006.01)
 *B01D 61/02* (2006.01)
 *B01D 71/54* (2006.01)

(52) U.S. Cl.
 CPC ........... *B01D 69/10* (2013.01); *B01D 69/125* (2013.01); *B01D 69/148* (2013.01); *B01D 71/56* (2013.01); *B01D 71/60* (2013.01); *C02F 1/44* (2013.01); *B01D 61/027* (2013.01); *B01D 71/54* (2013.01); *B01D 2323/30* (2013.01); *B01D 2323/40* (2013.01); *B01D 2325/08* (2013.01); *B01D 2325/20* (2013.01)

(56) References Cited

U.S. PATENT DOCUMENTS

| | | |
|---|---|---|
| 4,872,984 A | 10/1989 | Tomaschke |
| 5,173,191 A | 12/1992 | Black |
| 5,246,587 A | 9/1993 | Tomaschke |
| 5,358,745 A | 10/1994 | Tran et al. |
| 5,922,203 A | 7/1999 | Tomaschke |
| 5,989,426 A | 11/1999 | Hirose et al. |
| 6,015,495 A | 1/2000 | Koo et al. |
| 6,177,011 B1 | 1/2001 | Hachisuka et al. |
| 6,878,278 B2 | 4/2005 | Mickols |
| 6,986,844 B2 | 1/2006 | Barss et al. |
| 8,196,754 B2 | 6/2012 | Ho |
| 8,443,986 B2 | 5/2013 | Tanaka et al. |
| 8,993,053 B2 | 3/2015 | Jeong et al. |
| 9,643,209 B2 | 5/2017 | Jeong et al. |

OTHER PUBLICATIONS

Tan, Shengfu Chen, et al. Polyamide membranes with nanoscale Turing structures for water purification. Science 360(6388), 518-521.

Reaction Diffusion

Turing Instability

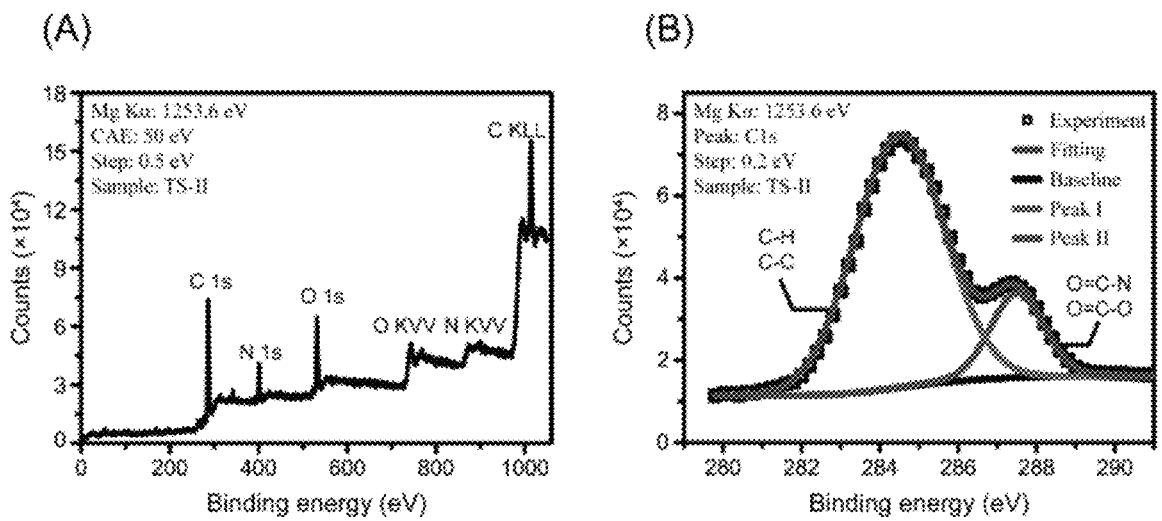
FIG. 29
| Sample | Surface element composition (%) | | | Contact angle (°) |
|---|---|---|---|---|
| | C | N | O | |
| TS-I | 68.5 ± 1.1 | 13.8 ± 0.5 | 17.7 ± 1.0 | 31.2 ± 3.7 |
| TS-II | 68.0 ± 1.2 | 13.5 ± 0.7 | 18.5 ± 1.1 | 29.7 ± 3.3 |
| PA-I | 69.7 ± 0.8 | 12.9 ± 0.4 | 17.4 ± 0.7 | 30.5 ± 3.0 |
FIG. 30
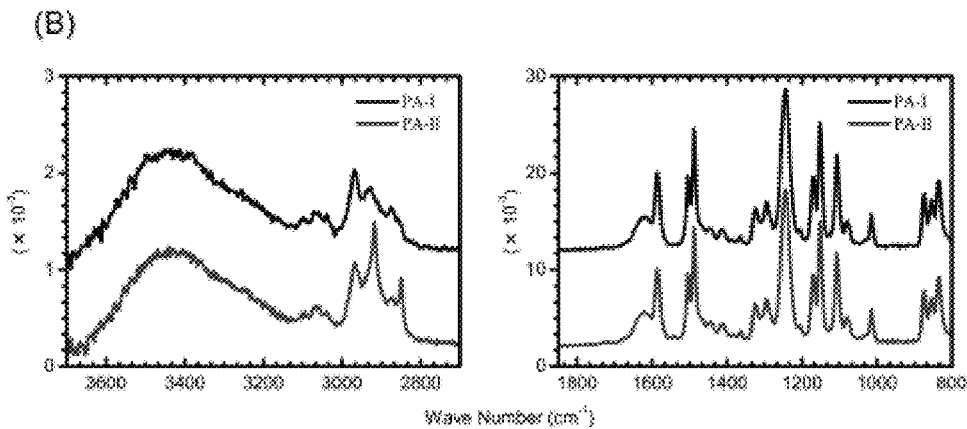
FIG. 31

| Sample | pH | Zeta potential (mV) |
|---|---|---|
| GNPs | 6.8 | -37.0 |
| TS-I | 7.0 | -29.1 |
| TS-II | 7.1 | -31.5 |
| PA-I | 7.0 | -30.2 |

SEMIPERMEABLE MEMBRANE AND PREPARATION METHOD THEREOF

CROSS REFERENCE TO RELATED APPLICATION

This application claims the priority benefit of Chinese Patent Application Nos. 201810120316.2, filed on Feb. 7, 2018, which is hereby incorporated by reference in its entirety.

FIELD OF THE INVENTION

The invention relates to the field of separation and material, and in particular to a method for preparing a semipermeable membrane and an application thereof.

BACKGROUND OF THE INVENTION

A permselective membrane is a membrane that selectively passes through the passage of different substances, particles or molecules and can be used for the separation of substances. The semipermeable membrane may be a positive osmosis membrane, a reverse osmosis membrane, an ultrafiltration membrane, a nanofiltration membrane, or a microfiltration membrane. The material of the semipermeable membrane may be a polymer such as polyamide or polyester.

The selective semipermeable membrane allows separation, purification, and concentration of the different components in the feed solution. Among them, polyamide-based semipermeable membranes can be used to separate salts or small molecules in aqueous solutions, and thus are widely used in the desalination of brackish water or seawater, as well as in the printing, electroplating, petrochemical and municipal wastewater recycling, providing salt-free or preliminary purified water for industry, agriculture and municipalities.

Commercially available polyamide-based semipermeable membranes are currently prepared by interfacial polymerization on porous substrates. A composite aromatic polyamide semipermeable membrane obtained by interfacial polymerization of at least two primary amine-substituted aromatic polyamines and at least three acid-substituted aromatic polyacid halides is disclosed in U.S. Pat. No. 4,277,344. In a preferred embodiment, the polysulfone porous substrate is first coated with an aqueous solution of 1,3-phenylenediamine, and then the 1,3,5-benzenetricarboxylic acid chloride dissolved in the organic solvent is contacted with the coating solution, and finally drying to obtain reverse osmosis composite membrane.

Commercially available polyamide semipermeable membranes can be classified into reverse osmosis (RO) and nanofiltration (NF) depending on the application. U.S. Pat. No. 4,769,148 discloses a novel semipermeable membrane obtained by interfacial polymerization of an amine monomer having at least two reactive functional groups, such as piperazine, amine-substituted piperidine, cyclohexanediamine, and a polyfunctional acid halide. In order to further improve the separation performance of the polyamide semipermeable membrane and optimize its chemical properties, it can be carried out by adding an additive to the solution system of the interfacial polymerization reaction.

A method of making a composite semipermeable membrane by coating an aqueous solution containing an ammonium salt or a reactive polyamine on porous substrate is disclosed in U.S. Pat. Nos. 4,872,984, 5,246,587 and 5,922,203. The polyamine used therein includes an aromatic primary diamine and a derivative thereof, the substituent group being an alkyl group, an alkoxy group, a hydroxyalkyl group, a hydroxyl group or a halogen atom; and the aliphatic polyamine includes piperazine or cyclohexanediamine, and derivatives thereof; and the ammonium salt includes salt of reactive/non-reactive amine with acid.

A process for producing a reverse osmosis membrane by reacting a polar compound with a polyfunctional acid halide, a polyfunctional sulfonyl halide, and a polyfunctional isocyanate in an aqueous phase is disclosed in U.S. Pat. No. 6,015,495. The polar compound is selected from alkyl substituted 1,3-propanediol, 1,2-alkyl glycol, di (ethylene glycol) hexyl ether, di (ethylene glycol) tert-butyl methyl ether, tri(ethylene glycol) dimethyl ether or 1, x-cyclohexane dimethanol, wherein x is an integer from 2 to 4.

A method for producing a highly permeable reverse osmosis semipermeable membrane is disclosed in Chinese Patent No. 1,158,274. The method comprises adding at least one alcohol, ether, ketone, halogenated hydrocarbon, nitrogen-containing compound, and sulfur-containing compound additive to at least one solution before interfacial polymerization, and preparing the surface of the reverse osmosis semipermeable membrane. It is coated with a positively charged organic polymer crosslinked coating. Among the preferred positively charged organic polymers are crosslinked polyethyleneimines. A method of producing a reverse osmosis membrane by reacting a solvent or a mixed solvent having different solubility parameters onto a surface of a porous substrate and reacting with an organic phase containing an acid chloride is disclosed in Chinese Patent No. CN 103,648,622. The solubility parameter of the solvent used is 21 $(J/cm3)^{1/2}$ to 30 $(J/cm3)^{1/2}$, including acetone, tetrahydrofuran, methyl acetate, chloroform, methanol, ethylene glycol, etc. A variety of solvents and mixtures thereof.

A method of adding a complexing agent to an interfacial polymerized non-polar solution phase to enhance the properties of a polyamide semipermeable membrane is disclosed in U.S. Pat. No. 6,878,278. The method contacts the complexing agent with a polyfunctional acid halide prior to the polymerization reaction to associate the complexing agent with the acid halide. Comprising the complexing agent is selected from non-sulfur containing binding core atom, the phosphorus-containing compound is selected from primary phosphate, phosphite or hypophosphite like. The compounds selected in the examples include trimethyl phosphate, triethyl phosphate, tripropyl phosphate, tributyl phosphate, triamyl phosphate, trihexyl phosphate or triphenyl phosphate.

Commercially available polyamide semipermeable membranes are mostly polysulfone or polyethersulfone ultrafiltration membranes. The solvent resistance of such polymers limits the use of composite liquid separation membranes in the separation of organic solvents. U.S. Pat. Nos. 5,173,191 and 6,986,844 disclose the use of nylon, cellulose, polyester, polytetrafluoroethylene, polypropylene, and crosslinked polybenzimidazole as porous substrates for the manufacture of composite semipermeable membranes, which can be used to contain specific Separation of organic solvent feed.

In practical applications, the polyamide semipermeable membrane has problems such as a decrease in flux caused by contamination. In order to reduce the occurrence of pollution, a method of coating a reverse osmosis membrane with a hydrophilic macromolecule such as polyvinyl alcohol (PVA) is disclosed in U.S. Pat. Nos. 5,358,745, 6,177,011, and Chinese Patent No. CN 101,820,983. The method can improve the charging performance of the surface of the semipermeable membrane and improve the anti-pollution and running stability of the membrane.

U.S. Pat. No. 8,196,754 discloses the addition of a hydrophilic monomer containing at least one reactive functional group to an aqueous phase in an interfacial polymerization to react with a polyacid chloride in an organic phase to obtain a high permeability flux reverse osmosis composite membrane. The addition of a hydrophilic additive significantly increases the rate of penetration of the reverse osmosis membrane into the water, while further improving the water flux of the reverse osmosis membrane using a series of post treatments.

Membrane separation is a separation technique for solid-liquid separation by interception. It has been widely used in the field of water purification (Bolisetty, S. et al. Amyloid-carbon hybrid membranes for universal water purification. Nature Nanotechnology 11, 365-372 (2016). Shannon, M A et al. Science and technology for water purification in the coming decade's purification in the coming decades. Nature 452, 301-310 (2008). A membrane is a physical barrier that allows small-sized materials to pass through but traps large-sized materials. The pore size of the membrane can be regulated, and even the reverse osmosis membrane can trap ions. However, the pore size and flux of the membrane are a contradiction. The smaller the pore size of the membrane, the smaller the size of the material that can be trapped, the higher the operating pressure and the higher the operating energy during application (ElMekawy, A. et al. The near-Future integration of microbial desalination cells with reverse osmosis technology. Energy Environ. Sci. 7, 3921-3933 (2014).

The prior questions of the semipermeable membrane are as follows: selective membrane permeability (the SELECTIVITY) and flux (Flux) are two difficult contradictions. The flux refers to the water permeability $P_w$ (Water Permeability), as shown in the abscissa of FIG. 1; and the selective permeability refers to the ratio of the water permeation amount $P_w$ to the salt permeation amount $P_s$ (Water-Salt selectivity, $P_w/P_s$), as shown on the ordinate of FIG. 1. FIG. 1 summarizes the limitations of existing semipermeable membranes on salt ion permeation and water flux (Geise, Geoffrey M., et al. Water permeability and water/salt selectivity tradeoff in polymers for desalination." Journal of Membrane Science 369.1-2 (2011): 130-138. Trade-off line refers to the equilibrium boundary line between the flux and salt ion selectivity of the existing semipermeable membrane, which is obtained by counting the data of the existing semipermeable membrane material. The upper-bound line refers to the upper limit of the performance of the existing semipermeable membrane material, which is obtained by establishing a theoretical model of the membrane separation process and further deriving it. At present, the permeability of existing semipermeable membrane materials is limited to within the Trade-off line. In the lower left area of the Trade-off line in FIG. 1, including the Trade-off line, the circle on the Trade-off line represents the best performance of the various semipermeable membrane materials made in the prior art. It is well known to those skilled in the art that the performance of existing semipermeable membrane materials cannot break through the upper-bound line, only within the Trade-off line of FIG. 1. Even if the existing semipermeable membrane material achieves a good selective permeability, it cannot simultaneously break the theoretical limit of flux.

SUMMARY OF THE INVENTION

In view of the deficiencies of the prior art, the present invention provides a semipermeable membrane that breaks the theoretical limit of flux while ensuring high selective permeability of the membrane, and also its preparation method and usage. The theoretical limit of flux refers to the upper-bound line in FIG. 1.

The structure of the semipermeable membrane is the main factor affecting its separation performance. It is difficult to obtain a semipermeable membrane having both high throughput and high selective permeability in the prior art manufacturing process. Developing a new method to produce a semipermeable membrane with an excellent separation structure is the key to solve this problem. The inventors conducted a lot of scientific research on the reaction diffusion process of interfacial polymerization and accidentally produced a complex periodic pattern structure on the surface of the membrane. Through the control of the diffusion coefficient of the monomer in the two-phase reaction medium during the interfacial polymerization process, the membrane surface realizes the controllable synthesis of such complex periodic pattern structure and constructs a new technology to control the interface polymerization process. After testing, this semipermeable membrane with a complex periodic pattern structure overcomes the drawback that the traditional semipermeable membrane is difficult to achieve both high throughput and high selective permeability. Scientific research has confirmed that due to the existence of the complex periodic pattern structure, this semipermeable membrane has achieved an unexpectedly large increase in both the flux and selective permeability, breaking through the limits of semipermeable membrane materials (the upper-bound line in FIG. 1). That is, the performance of the semipermeable membrane material produced by the present invention is located in the upper right area of the upper-bound line (TS-I and TS-II in FIG. 1). Specifically, TS-I, TS-II refers to a semipermeable membrane material obtained by the method of interfacial polymerization of the present invention, and its flux and selective permeability significantly break through the limits of existing semipermeable membrane materials. Further, the control technology of the interfacial polymerization process of the present invention indicates for the first time that the precise regulation of the monomer diffusion rate is a key technical means for preparing the semipermeable membrane having the complex periodic pattern structure, and the prior art has not considered and studied this key technical means. By designing the two phases of the interfacial polymerization system, the inventors control the diffusion coefficient difference of the semipermeable membrane synthetic monomer more than 10 times by means of one or more additives and achieve precise regulation of the interfacial polymerization process. A breakthrough in the performance bottleneck of semipermeable membranes is achieved by simply adding one or more auxiliaries. In terms of mechanism, the technology of the present invention fundamentally explains the "reaction-diffusion" process of interfacial polymerization. In terms of practical applications, the technology of the present invention does not require updating the reaction equipment of the prior art, only by adding one or more additives to the interfacial polymerization system to adjust the diffusion coefficient of the semipermeable membrane synthetic monomer, which allows the technology to be easily integrated into existing production lines without further investment, which results in far-reaching practical and commercial value.

Known as the "father of the modern computer with artificial intelligence" of Alan Turing in the 1952 paper, "Chemical Basis of Morphogenesis" had been given such an interpretation. He believes that there is a kind of substance called "morphomorphin" in the living body, one of which can promote the reaction, and the other will inhibit the reaction. When they meet, they will spread while reacting to form a system. In the case of uniform diffusion, the system will exhibit a homogeneous system characteristic and will not produce a pattern, but when there is a difference between the two diffusions and reach a certain extent, the system will be unbalanced, eventually forming a complex periodic pattern structure. This is the famous "reaction-diffusion equation", and the structure formed according to this principle is called "Turing structure".

Alan Turing's 1952 paper, "the chemical basis of morphogenesis," theoretically analyzed the two chemicals activator (activator) and inhibitors (inhibitor). As shown in FIGS. 3 and 4, the activator and the inhibitor react and diffuse under specific conditions to produce a spatiotemporal fixed structure that reacts and diffuses under specific conditions to produce a spatiotemporal fixed structure. Turing's thought profoundly influenced people's understanding of the theory of pattern formation in chemical and biological systems, but it was not until nearly 40 years after his paper was published that it was confirmed by the chlorite-iodine-malonic acid (CIMA) reaction. After about 10 years, a stationary Turing state was also observed in the Belousov-Zhabotinsky (BZ) reaction microemulsion consisting of reverse micelles. Recently, a variety of two- and three-dimensional stationary structures were studied in chemical and biological systems.

In the present invention, the complex periodic pattern structure refers to Turing structure. For details, it refers to the explanation of the Turing structure as described above. See also "Turing Structure, Xu Wenliu et al., Science, Vol. 47, No. 4, No. 27-30 pages, 1995". In Summary, if in a stable homogeneous chemical reaction system, the system is destabilized due to diffusion and a new stable chemical concentration is generated in spatially uneven distribution, the system is considered to have Turing instability. The static concentration pattern becomes the Turing structure, see FIG. 2-1. In essence, the "Turing structure" is a fixed structure of time and space. For other Turing structures, see FIGS. 2-2 and 2-3.

The inventors' research found that the necessary condition for the Turing structure is that the difference between the diffusion coefficients of the two reactants is more than an order of magnitude. This requires precise regulation of the diffusion rate of the monomer in the interfacial polymerization process. The key to the Turing reaction-diffusion equation is that the diffusion rates of the activator and the inhibitor in the reaction must be of the order of magnitude.

The present invention has intensively discovered that it is possible to efficiently and efficiently obtain a polymer membrane having a Turing structure by interfacial polymerization, specifically, by controlling the diffusion of monomers in different polymerization phases during interfacial polymerization. The coefficient can effectively prepare a polymer semipermeable membrane of a specific Turing structure. Through testing, the inventors have unexpectedly discovered that the polymer semipermeable membrane has a delicate three-dimensional membrane structure and excellent water-salt separation performance.

The emergence of Turing structure is of fundamental importance, and designing these structures and developing their applications have practical effects in chemistry and biology. The inventors use a facile route based on interfacial polymerization to generate Turing-type polyamide membranes for water purification. Manipulation of shapes The control of the reaction of the creation of membranes with bubble or tube structures. These membranes exhibit excellent water-salt separation performance that surpasses the upper-bound line of traditional desalination membranes. In addition, high water permeability sites take shape in the Turing structure and the water transport properties of the membrane are also improved.

Interfacial polymerization is a reaction-diffusion process that is far from thermodynamic equilibrium. It is based on the Schotten-Baumann reaction in which the irreversible polymerization of two rapidly reacting polyfunctional monomers occurs near the interface of the two immiscible phases of the heterogeneous liquid system. This technology has been used to prepare reverse osmosis membranes and nanofiltration membranes for large scale and low-cost water purification applications. In a typical membrane synthesis process (FIG. 5), the organic amine dissolves in water, while the acid chloride dissolves in the organic solvent and forms a very thin, insoluble polyamide (PA) membrane on top of the porous substrate (FIGS. 6 and 7).

In order to solve the technical problem of the present invention, the following technical solutions are adopted:

The present invention provides a method of preparing a semipermeable membrane comprising the steps of preparing a semipermeable membrane from solution A and solution B by interfacial polymerization in the presence of a porous substrate; the solution A comprising an amino group and/or amino compound and a polar solvent; solution B comprises the acid halide group and/or compounds and a non-polar solvent b isocyanate-containing group; and a diffusion coefficient of the compound in the solution and DA the diffusion coefficient DB of the compound b in the solution B satisfies the following formula: $DB/DA \geq 10$.

The diffusion coefficient refers to the ratio between the molecular flux and the molecular concentration gradient generated by molecular diffusion.

The Diffusion-ordered Nuclear Magnetic Resonance spectroscopy (DOSY-NMR) is an important method for determining the self-diffusion coefficient. It is based on the translational motion of molecules that can be encoded by the pulsed field gradient (PFG). A logically linear relationship is established with the spatial gradient to determine the diffusion coefficient of a particular molecule, and in particular, to determine the diffusion coefficient of the activator and inhibitor. Further, the diffusion coefficient of the nano water droplets in the oil phase solution is obtained by measuring the diffusion coefficient of water in the water-in-oil microemulsion system.

Diffusion-Ordered Spectroscopy NMR (DOSY-NMR) is an important method now for the determination of self-diffusion coefficient, which have now been widely used in different areas of supermolecule, molecular self-assembly, a molecular probe, and host-guest recognition. On translational motion of molecules which can be encoded by pulsed field gradient (PFG), it builds a logical linear relationship between molecular motion and spatial gradient.

The diffusion coefficient is affected by many factors. In particular, strong intermolecular interactions in a liquid environment can effectively change the diffusion coefficient of a molecule. Further, through hydrogen bonding interactions, reversible bond interactions, coordination bond interactions, Adsorption desorption interaction, size exclusion interaction, macroscopic mechanical interaction due to viscosity or flow, and/or introduction of differences in intermolecular diffusion coefficients in the system, preferably, the selected material interacts by reversible chemical bonds, and the diffusion coefficient of the activator can be lowered.

In particular, a dispersed homogeneous multiphase system can be used to limit the activator of the reaction to a phase having a lower migration rate, thereby reducing the diffusion coefficient of the activator.

In some embodiments, the method for preparing a semipermeable membrane of the present invention comprises the following steps:

S1. Coating a surface of the porous substrate with a solution A to form a liquid membrane on the surface of the porous substrate.

S2. The liquid membrane in step S1 is brought into contact with the solution B, and a separation layer is formed by interfacial polymerization to obtain the semipermeable membrane.

In some embodiments, in the step S1, the residence time after the coating is 10~600 s, preferably 20~300 s, the residence time of the liquid membrane 10~600 s; and/or, in the step S2, the reaction time of interfacial polymerization is 10~600 s, preferably 20~300 s.

In some embodiments, $10 \leq DB/DA \leq 105$; preferably, $10 \leq DB/DA \leq 100$; more preferably, $DB/DA=50$.

In some embodiments, the compound of a structural formula $R(NHx)n$, $1 \leq x \leq 2$, $2 \leq n \leq 3$, and R is selected from aromatic ring, alicyclic ring, aromatic heterocyclic ring, heterocyclic ring, carbon chain; preferably the content of the compound a in the solution A is 0.1~5.0 (w/v) %. In the present invention, the unit of w/v is g/L, and the following units are the same here.

More preferably, R can be selected from saturated or unsaturated C1-C32 alkyl, halogenated C1-C32 alkyl, C1-C32 alkoxy, halogenated C1-C32 alkoxy alkyl. R also can be selected from unsubstituted or substituted aryl, unsubstituted or substituted heterocyclic aryl, unsubstituted saturated or partially saturated heterocycloalkyl, unsubstituted or substituted cycloalkyl, substituted saturated or partially saturated cycloalkyl.

Further preferably, the compound a is selected at least one or more from 1,2-phenylenediamine, 1,3-phenylenediamine, 1,4-phenylenediamine, 2,4-diaminotoluene, 2,6-diaminotoluene, 1,2-phenyldimethylamine, 1,3-xylylenediamine, 1,4-xylylenediamine, 1,3,5-triaminobenzene, ethylenediamine, 1,3-propanediamine, 1,4-butanediamine, tris(2-aminoethyl) amine, 1,2-diaminocyclohexane, 1,3-diaminocyclohexane, 1,4-diaminocyclohexane, and piperazine.

In some embodiments, the compound b is polyisocyanate and/or the compound containing at least two acid halide groups; preferably, the compound b is contained in the solution B in an amount of 0.01 to 5.0 (w/v) %, more preferably 0.05~2.0 (w/v) %.

In some embodiments, the polyisocyanate is selected at least one or more from toluene diisocyanate, diphenylmethane diisocyanate, hexamethylene diisocyanate, 1,4-Phenylene diisocyanate, isophorone diisocyanate, methylene-bis(4-cyclohexyl isocyanate), naphthalene diisocyanate, 1,4-cyclohexane diisocyanate, xylyl diisocyanate, bis(isocyanatomethyl)-cyclohexane, lysine diisocyanate, dimethyl diphenylmethane diisocyanate, methyl cyclohexyl diisocyanate, polymethylene phenyl isocyanate or their oligomers thereof.

The compound containing at least two acid halide groups has a molecular formula of $R(COX)n$, $2 \leq n \leq 4$, and X is one of the halogens, and R is selected at least one or more from aromatic ring, alicyclic ring, heteroaromatic ring, heterocyclic ring, carbon chain; further preferred that the compound b is selected at least one or more from 1,3,5-Benzenetricarboxylic acid chloride, 1,4-phthaloyl dichloride, 1,3-phthaloyl dichloride, 2,6-pyridine dicarboxylic acid chloride, 2,5-thiophenedicarbonyl dichloride, 2,5-furandicarbonyl dichloride, 4,4'-biphenylacetyl chloride, glutaryl chloride, adipoyl chloride, heptanedioyl dichloride, suberoyl chloride, azelaoyl chloride, sebacoyl chloride, cyclohexyl-1,4-dicarbonyl chloride, 1,3-adamantanedicarbonyl dichloride.

The polar solvent refers to a solvent in which the solvent molecule is a polar molecule, and further, the polar solvent is preferably water, dimethylformamide, dimethylacetamide, alcohols, ketones, esters, etc. Preferably, the polar solvent is selected one or more from methanol, ethanol, isopropanol, acetone, methyl ethyl ketone, diethyl ketone, ethyl acetate, propyl acetate, butyl acetate. More preferably, water is used as the polar solvent.

In some embodiments, the non-polar solvent is selected one or more from the mixture of C6-C14 isisoparaffins, cycloalkane, and aromatic hydrocarbon. Preferably, the non-polar solvent is selected one or more from cyclopropane, cyclohexane, cyclobutane, cyclopentane, toluene, ethylbenzene, xylene. More preferably, a non-polar solvent is produced by ExxonMobil or hexane.

In some embodiments, solution A includes an optional material which reduces the diffusion coefficient of the compound a in the solution A. Further, the material is selected one or more from macromolecule and nanoparticle.

In some embodiments, the macromolecule has at least one capable of forming an intermolecular hydrogen bond and/or an intramolecular hydrogen bond to lower the diffusion coefficient of the compound a in the solution A. Further, the minimum weight average molecular weight is about 5,000; preferably, The content in solution A is 0.01 to 0.05 (w/v) %; preferably, the macromolecule is one or more selected from the group consisting of agarose, starch, carboxymethyl starch, hydroxymethyl cellulose, carboxymethyl cellulose, carboxylated shell Glycan, polyacrylic acid, polyacrylamide, sodium polystyrene sulfonate, polyethylene glycol, polyvinyl alcohol, polyethyleneimine, polyvinylpyrrolidone, polyaniline, polypyrrole, polythiophene, and polyquaternium.

In some embodiments, the nanoparticle has a particle diameter of 100 nm or less, preferably 20-50 nm; further, the nanoparticle is an organic or inorganic substance, and further nanoparticles are selected from surface hydroxylated nanotubes, graphene, and nitrogen. Carbon, surface carboxylated nanotubes, graphene, carbon nitride, surface aminated nanotubes, graphene, carbon nitride, any one or more.

In some embodiments, solution A further comprises at least one additive selected from the group consisting of a catalyst, a surfactant, a zwitterionic compound, an acid or a base.

Preferably, in the solution A, the content of the catalyst accounts for 0.005 to 0.05 (w/v) %; the content of the surfactant accounts for 0.005 to 0.5 (w/v) %; and the content of the zwitterionic compound accounts for 0.005 to 0.5% (w/v) %; acid or base content is 0.005~0.5 (w/v) %.

Preferably, the surfactant is selected from the group consisting of sodium lauryl sulfate, sodium hexadecyl sulfonate, sodium dodecyl benzene sulfonate, sodium diisooctyl sulfosuccinate, dodecyl trimethyl ammonium chloride, tetradecyl trimethyl ammonium chloride, dodecyl trimethyl ammonium bromide, tetradecyl trimethyl ammonium bromide, cetyl trimethyl ammonium chloride, octadecyl three Methyl ammonium chloride, cetyltrimethylammonium bromide, octadecyltrimethylammonium bromide, dihexadecyldimethylammonium chloride, dioctadecyldimethyl chloride Ammonium, dihexadecyldimethylammonium bromide, dioctadecyldimethylammonium bromide, benzylammonium chloride, benzethonium chloride, sodium laurylaminopropionate, lauryl dimethyl Base amine oxide, cocamidopropyl betaine, cocamidopropyl hydroxy sultaine, sorbitan monosuccinate trioleate, sorbitan monodecanoate, sorbitan tristearate Any one or more of an acid ester, sorbitan trioleate polyoxyethylene ether, polyethylene glycol octyl phenyl ether, and heptadecafluorooctane sulfonic acid.

Preferably, the zwitterionic compound is one or more selected from the group consisting of sulfamic acid, 2-aminoethanesulfonic acid, N-cyclohexylsulfamic acid, 2-[4-(2-hydroxyethyl)piperazin-1-yl]ethanesulfonic acid, betaine, (3-carboxypropyl) trimethyl Ammonium chloride, glycine, 2-aminobenzoic acid, 3-aminobenzoic acid, 4-aminobenzoic acid, 2-aminobenzenesulfonic acid, 3-aminobenzenesulfonic acid, 4-aminobenzenesulfonic acid, 4-acetyl amino-2-aminobenzenesulfonic acid, 2-(N-morpholine)ethanesulfonic acid. N-2-cyclohexylaminoethanesulfonic acid, N-hydroxysuccinimidesulfonic acid, L-leucine benzyl ester p-toluenesulfonic acid, L-valine benzyl p-toluenesulfonic acid and trimethylsilyl trifluoromethanesulfonic acid.

Preferably, the acid or base is selected from the group consisting of hydrochloric acid, sulfuric acid, nitric acid, phenol, 4-methylphenol, benzoic acid, 4-methylbenzoic acid, 2-hydroxybenzoic acid, 3-hydroxybenzoic acid, 4-hydroxybenzoic acid, Benzenesulfonic acid, 4-methylbenzenesulfonic acid, 1,5-naphthalene disulfonic acid, camphorsulfonic acid, L-leucine benzyl p-toluenesulfonic acid, L-valine benzyl p-toluenesulfonic acid, three Methylsilyl trifluoromethanesulfonic acid, 1,4-piperazine diethanesulfonic acid, piperazine-1,4-bis(2-ethanesulfonic acid), 3-(N-morpholinyl) propanesulfonic acid, 4-morpholinepropanesulfonic acid, piperazine-N,N'-bis (2-ethanesulfonic acid), sodium hydroxide, potassium hydroxide, sodium carbonate, potassium carbonate, sodium phosphate, disodium hydrogen phosphate, dihydrogen phosphate Sodium, potassium phosphate, potassium dihydrogen phosphate, dipotassium hydrogen phosphate, ammonium chloride, ammonium persulfate, trimethylamine, triethylamine, tripropylamine, triethylenediamine, pyridine, 4-dimethylaminopyridine, piperidine, 4-hydroxypiperidine, morpholine, N-methylmorpholine, tetramethylethylenediamine, tetramethylguanidine, 1,8-diazabicycloundec-7-ene and 1,5-diazabicycloindole-5-ene.

The catalyst is preferably selected from the group consisting of pyridine, 4-dimethylaminopyridine, piperidine, 4-hydroxypiperidine, morpholine, N-methylmorpholine, cetyltrimethylammonium chloride, octadecyltrimethyl At least one of ammonium chloride, cetyltrimethylammonium bromide, and octadecyltrimethylammonium bromide.

In some embodiments, the solution B further comprises an additive selected from at least one of a cosolvent, a complexing agent and a phase transfer agent; the additive content is 0.01 to 5.0 of the amount of solution B (w/v) %, especially 0.05-2.0 (w/v) %; preferably the additive is selected from at least one of an alcohol, an ether, an aldehyde, an acid anhydride, a ketone or an ester. More preferably, the additive is at least one selected from the group consisting of methanol, ethanol, ethylene glycol, propanol, isopropanol, sorbitol, glycerin, glycidol, acetone, 2-butanone, cyclohexanone, diethyl ether, ethylene glycol dimethyl ether, diglycidyl ether, ethylene alcohol diglycidyl ether, pentaerythritol glycidyl ether, glutaraldehyde, glyoxal, succinic anhydride, maleic anhydride, tetrahydrofuran, 1,4-dioxane, chloroform, methyl acetate, ethyl acetate, trimethyl phosphate, triethyl phosphate, tripropyl phosphate, tributyl phosphate, triamyl phosphate, triphenyl phosphate, N,N-dimethylformamide amine, N,N-dimethylacetamide, N-methylpyrrolidone, dimethyl sulfoxide or sulfolane at least one; further preferably comprising acetone, isopropanol, ethyl acetate and dimethyl sulfoxide.

The present invention also provides a semipermeable membrane comprising a porous substrate and a separation layer, characterized in that the separation layer has an ordered pattern composed of microstructures; the microstructure is selected from the group consisting of a speckled structure and a vesicular structure (At least one of spots, a stripes, a stripe structure, and a ring structure, the microstructure being a three-dimensional hollow structure. In particular, a schematic view of the microstructure includes the following: punctate structures in FIG. 8, a vesicular structure (Spots) in FIG. 9, the tubular structure (Stripes), a stripe-like structure in FIG. 10, a ring structure is as shown in FIG. 11, and various structures coexist as shown in FIG. 12. The microstructure of the semipermeable membrane of the present invention may be of FIG. 8-FIG. 12 is similar to the pattern in an ordered pattern.

The semipermeable membrane of the present invention can be prepared by any of the interfacial polymerization reactions described hereinbefore.

In some embodiments, the semipermeable membrane has a three-dimensional nano-scale Turing structure generated in situ, and the Turing structure is a static concentration pattern in which the concentration of the chemical substance formed by the instability of the system caused by diffusion causes space to periodically change.

In some embodiments, the microstructure is a nano-scale structure and/or a micro-scale structure.

In some embodiments, the microstructure is selected from one or more of a nanotube structure, a nanobubble structure, a nano popular structure, and a nanoring structure.

In some embodiments, the microstructure is a microstructure composed of any geometric shape, preferably a circular structure and/or a square structure.

In some embodiments, the semipermeable membrane comprises a porous substrate and a nano-separation layer. The three-dimensional nano-scale Turing structure is located on the nano-separation layer; and preferably, the porous substrate has a surface pore diameter of from 2 nm to 1,000 nm, and the molecular weight is cut. It is from 2,000 to 200,000 Daltons.

In some embodiments, the semipermeable membrane is a polyamide semipermeable membrane obtained by reacting a compound a with a compound containing at least two acid halide groups; or a polyurea semipermeable membrane prepared by reacting a polyisocyanate with a polyamine.

The invention further provides a semipermeable membrane prepared by any of the methods described above or a semipermeable membrane of any of the forms described above for use in the field of fluid separation, preferably in the field of water treatment and/or desalination application. Among them, the water treatment field includes the production of ultrapure water, desalinization of brackish water, desalination of seawater, separation of pollutants from printing and dyeing, electroplating or petrochemical wastewater, and recovery of resources, and the like.

The invention further provides a membrane module comprising a semipermeable membrane prepared by any of the methods described above or a semipermeable membrane of any of the foregoing forms.

According to a preferred embodiment of the present invention, the semipermeable membrane is a polyamide semipermeable membrane having a Turing structure, which has good separation performance, high permeation flux to water and good retention of salt, in relative High water permeation flux and stable retention at lower pressures; high anti-pollution performance. The invention also relates to a process for the preparation of the polyamide semipermeable membrane and to its use.

According to one aspect of the invention, a polyamide semipermeable membrane is provided having a three-dimensional nano-scale Turing structure generated in situ. Wherein, the three-dimensional nano-scale Turing structure comprises one or more of a nanotube structure, a nanobubble structure, a nanopopular structure and a nanoring structure.

According to a preferred embodiment of the present invention, the polyamide semipermeable membrane comprises a porous substrate and a polyamide nano-separation layer, the three-dimensional nano-scale Turing structure being located on the polyamide nano-separation layer. On the polyamide nano-separation layer, there are three-dimensional nano-scale Turing structures, such as nanotubes, nanobubbles, nano-spots, nano-rings and the like, or a three-dimensional topology composed of the microstructures. This type of structure is suitable for improving the separation performance of the polyamide semipermeable membrane, and simultaneously improves the permeation flux of the semipermeable membrane to water and the retention property of the salt. Turing structure comprising the semipermeable membrane at relatively low pressure can be maintained on a high water permeability, and stability of trapped. Experiments show that the semipermeable membrane possessing the Turing structure has a high removal rate of salt ions or small molecular organic substances, and the anti-pollution performance is superior to the polyamide semipermeable membrane manufactured by the conventional method.

The invention is not specifically limited to a particular type or shape of the composite semipermeable membrane. For example, the semipermeable membrane of the present invention may include a flat plate, a tubular or hollow fibre polyamide semipermeable membrane, or the like used in fluid separation such as forward osmosis (FO), reverse osmosis (RO), and nanofiltration (NF). Typically, RO and FO type semipermeable membranes block more than about 95% of the monovalent salt ions and organic molecules having a molecular weight greater than about 100 Daltons. Compared to RO membranes, NF membranes are more permeable, typically blocking less than about 95% of monovalent salt ions, while depending on the type of divalent ions, blocking more than about 50% (often more than 90%) of divalent ions. In addition, the NF membrane blocks nano-scale particles as well as organic molecules with a molecular weight of approximately 200 to 500 Daltons.

According to a preferred embodiment of the present invention, the porous substrate has a surface pore diameter of from 2 nm to 1,000 nm and a molecular weight cut of from 2,000 to 200,000 Daltons. Porous substrates with different surface pore sizes are selected depending on the membrane species used in the fields of positive permeation, reverse osmosis and nanofiltration. The porous substrate used in the present invention has good water permeability, and its kind is not limited, and it is required to be capable of substrateing, and it is preferred to use an asymmetric structure ultrafiltration membrane reinforced by a nonwoven fabric or a woven fabric. The material for manufacturing the porous substrate can be obtained from cellulose, cellulose acetate, polyvinyl chloride, polypropylene, polyacrylonitrile, polysulfone, polyethersulfone, polyetheretherketone, polyamide, polyimide, polyamide-acyl Amine, polyetherimide, polybenzimidazole, polycarbonate, poly (methyl methacrylate) or various halogenated polymers such as amorphous fluoropolymer or polyvinylidene fluoride are selected.

Preferably, the material of the porous substrate has excellent thermal stability, chemical stability and mechanical properties, such as polysulfone, polyethersulfone, polyimide, polyamide-imide or polyetherimide.

The porous substrate of the present invention can also be formed by extruding or coating a polymer solution from a tubular spinneret on a substrate; then subjecting it to phase separation by changing the temperature or immersing in a coagulation bath; after complete curing, A substrate having a porous structure on the surface is obtained. The porous substrate is of the flat, tubular or hollow fibre type.

According to the invention, the semipermeable membrane contains macromolecules in its chemical composition. According to a preferred embodiment of the method according to the invention, at least one of the macromolecules is capable of forming intermolecular hydrogen bonds and/or intramolecular hydrogen bonds. Its minimum molecular weight is about 5,000. The type of macromolecule is not limited and may be either reactive or nonreactive. The macromolecules may be used individually or in combination. In a preferred embodiment, the macromolecule comprised one or more selected from the group consisting of agarose, starch, carboxymethyl starch, hydroxymethylcellulose, carboxymethylcellulose, carboxylated chitosan, polyacrylic acid, polyacrylamide, sodium polystyrene sulfonate, polyethylene glycol, polyvinyl alcohol, polyethyleneimine, polyvinylpyrrolidone, polyaniline, polypyrrole, polythiophene, and polyquaternium. Preferably, the macromolecule has excellent thermal stability, chemical stability and mechanical properties, such as polyacrylamide, polyvinyl alcohol, polyethyleneimine or polyvinylpyrrolidone.

The present invention also provides the preparation method for the above-mentioned polyamide semipermeable membrane which comprising the following steps. On a porous substrat, a polar solution containing at least two amine groups and a macromolecular solvent contacts and reacts with a non-polar solvent solution containing at least two acid halide groups, and after post treatment, the polyamide semipermeable membrane is obtained.

According to a preferred embodiment of the method according to the invention, the kind of the compound containing at least two amine groups is not limited. In a preferred embodiment, the general structure of at least two amine-containing compounds is R(NHx) n, $1 \leq x \leq 2$, $2 \leq n \leq 3$, R(NHx)n may be an aromatic ring, an aliphatic ring, The heteroaryl ring, heterocyclic ring or carbon chain, that is, the compound containing at least two amine groups may be an aromatic polyamine, an aliphatic polyamine or an aliphatic cyclic polyamine. The compound containing at least two amine groups may be used singly or in combination. The aromatic polyamine is selected from the following monomers: 1,2-phenylenediamine, 1,3-phenylenediamine, 1,4-phenylenediamine, 2,4-diaminotoluene, 2,6-diamino Toluene, 1,2-xylylenediamine, 1,3-xylylenediamine, 1,4-xylylenediamine, 1,3,5-triaminobenzene, and the like. The aliphatic polyamine is selected from the group consisting of ethylenediamine, 1,3-propanediamine, 1,4-butanediamine, tris (2-aminoethyl) amine and the like. The aliphatic cyclic polyamine can be selected from the following monomers: 1,2-diaminocyclohexane, 1,3-Ring-diamino hexane, 1,4-diaminocyclohexane, piperazine and the like. Among the above polyfunctional amine monomers, 1,3-phenylenediamine or piperazine is preferred as the reactive monomer in the embodiment of the present invention. The polar solvent may be at least one selected from the group consisting of polar solvents commonly used in the art, such as water, dimethylformamide, dimethylacetamide, alcohol (methanol, ethanol, isopropanol, etc.), ketone (acetone), methyl ethyl ketone, diethyl ketone, etc.), ester (ethyl acetate, propyl acetate, butyl acetate, etc.). In the examples of the present invention, water is preferably used as the polar solvent. In a preferred embodiment, the compound containing at least two amine groups is contained in the polar solvent solution in an amount of from 0.1 to 5.0 (w/v) %.

According to a preferred embodiment of the present invention, the compound containing at least two acid halide groups is not particularly limited, and an aromatic or alicyclic compound containing at least two acid halide groups and a combination thereof may be used. In a preferred embodiment, the compound containing at least two acid halide groups has the formula R(COX) n, 2≤n≤4, X is one of the halogens, and R may be an aromatic ring, alicyclic, heteroaromatic, heterocyclic or carbon chain. Compared to bromides and iodides, chlorides are low cost and highly practical and are generally preferred. The aromatic or heteroaromatic compound containing at least two acid halide groups can be selected from the following monomers: 2,6-pyridinedicarboxylic acid chloride, 2,5-di(chloroformyl) thiophene, 2,5-furoyl dichloride, 4,4'-biphenylacetyl chloride, 1,3-phthaloyl chloride, 1,4-phthaloyl chloride, and 1,3,5-benzenetricarboxylic acid chloride. The alicyclic acid halide or carbon chain aliphatic acid halide is selected from the group consisting of glutaryl chloride, adipoyl chloride, pimelic acid chloride, suberly chloride, sebacic acid chloride, sebacic acid chloride, 1,4-cyclohexane Diacid chloride, 1,3-adamantane dichloride. In a specific embodiment, the compound containing at least two acid halide groups is 1,3,5-benzenetricarboxylic acid chloride. Non-polar solvents usually choose solvents with higher flash point and better safety, such as high boiling hydrocarbons, such as C8~C14 alkane mixtures, and isoparaffin, and/or, preferably, the flash point of the non-polar solvent is higher than 50° C.; as a non-polar hydrocarbon solvent to be used, in addition to comprising an outer alkanes, It may also contain a cycloalkane (such as cyclopropane, cyclohexane, cyclobutane, cyclopentane, etc.) and an aromatic hydrocarbon (toluene, ethylbenzene, xylene, etc.) and the like. In a specific embodiment, the non-polar solvent is a non-polar solvent produced by ExxonMobil. The content of the compound containing at least two acid halide groups in the non-polar solvent solution is from 0.01 to 5.0% (w/v) %, preferably from 0.05 to 2.0% (w/v) %.

According to a preferred embodiment of the method of the present invention, the polar solvent solution further comprises an additive selected from at least one of a catalyst, a surfactant, a zwitterionic compound, an acid or a base. The non-polar solvent solution further contains an additive selected from at least one of a cosolvent, a complexing agent, and a phase transfer agent. Various additives can control the rate or degree of interfacial polymerization, optimize the chemical structure or surface charge performance of polyamide semipermeable membrane, improve the wettability of polar solution to the porous substrate and assist the formation of Turing structure. To improve the wettability of the polar solution to the porous substrate, a surfactant may be added to the solution as needed. The surfactants may be used individually or in combination. It is one or more selected from the group consisting of sodium lauryl sulfate, sodium hexadecyl sulfonate, sodium dodecyl benzene sulfonate, sodium diisooctyl sulfosuccinate, dodecyl trimethyl ammonium chloride, tetradecane Trimethylammonium chloride, dodecyltrimethylammonium bromide, tetradecyltrimethylammonium bromide, cetyltrimethylammonium chloride, octadecyltrimethyl chloride ammonium, cetyltrimethylammonium bromide, octadecyltrimethylammonium bromide, dihexadecyldimethylammonium chloride, dioctadecyldimethylammonium chloride, double ten Hexaalkyldimethylammonium bromide, dioctadecyldimethylammonium bromide, benzylammonium chloride, benzethonium chloride, sodium laurylaminopropionate, lauryl dimethylamine oxide, cocamidopropyl betaine, cocamidopropyl hydroxysultaine, sorbitan monosuccinate trioleate, sorbitan monodecanoate, sorbitan tristearate, dehydration Sorbitol trioleate polyoxyethylene ether, polyethylene glycol octyl phenyl ether, heptadecafluorooctane sulfonic acid, and the like. Preferred is sodium dodecyl benzene sulfonate, sodium diisooctyl sulfosuccinate, cetyltrimethylammonium bromide or polyethylene glycol octylphenyl ether, and the concentration is usually from 0.01 to 1.0% (w/v).

In order to modulate the chemical structure or surface charge performance of the polyamide semipermeable membrane, a zwitterionic compound as an additive may be added to the polar solvent. Zwitterionic compounds may be added without reactive, it may be a reactivity with. The zwitterionic compounds may be used singly or in combination. The zwitterionic compound as an additive can be obtained from sulfamic acid, 2-aminoethanesulfonic acid, N-cyclohexylsulfamic acid, 2-[4-(2-hydroxyethyl)piperazin-1-yl]ethanesulfonic acid, betaine, (3-carboxypropyl) three methyl ammonium chloride, glycine, 2-aminobenzoic acid, 3-aminobenzoic acid, 4-aminobenzoic acid, 2-aminobenzenesulfonic acid, 3-aminobenzenesulfonic acid, 4-aminobenzenesulfonic acid, 4-acetylamino-2-aminobenzenesulfonic acid, 2-(N-morpholine) ethanesulfonic acid, N-2-cyclohexylaminoethanesulfonic acid, N-hydroxysuccinimidesulfonic acid, L-leucine benzyl ester p-toluenesulfonic acid, L-valine benzyl p-toluenesulfonic acid, and trimethylsilyl trifluoromethanesulfonic acid. The concentration of the zwitterionic compound is usually from 0.01 to 5.0% (w/v).

To control the extent of interfacial polymerization, an acid or a base may be added to the polar solution to change the progress of the reaction. The acid or base may be used singly or in combination. The acid or base means a compound in which the aqueous solution is acidic or basic. The acid or base as an additive is selected from hydrochloric acid, sulfuric acid, nitric acid, phenol, 4-methylphenol, benzoic acid, 4-methylbenzoic acid, 2-hydroxybenzoic acid, 3-hydroxybenzoic acid, 4-hydroxybenzoic acid, benzenesulfonic acid, 4-methylbenzenesulfonic acid, 1,5-naphthalene disulfonic acid, camphorsulfonic acid, L-leucine benzyl p-toluenesulfonic acid, L-valine benzyl p-toluenesulfonic acid, Trimethylsilyl trifluoromethanesulfonic acid, 1,4-piperazinediethanesulfonic acid, piperazine-1,4-bis (2-ethanesulfonic acid), 3-(N-morpholinyl) propanesulfonic acid, 4-morpholinepropanesulfonic acid, piperazine-N, N'-two (2-ethanesulfonic acid), sodium hydroxide, potassium hydroxide, sodium carbonate, potassium carbonate, sodium phosphate, disodium hydrogen phosphate, sodium dihydrogen phosphate, potassium phosphate, potassium dihydrogen phosphate, dipotassium hydrogen phosphate, ammonium chloride, ammonium persulfate, trimethylamine, triethylamine, tripropylamine, triethylenediamine, pyridine, 4-dimethylaminopyridine, piperidine, 4-hydroxypiperidine, morpholine, N-methylmorpholine, tetramethylethylenediamine, tetramethyl hydrazine, 1,8-diazabicycloundec-7-one or 1,5-diazabicyclo-5-one. The concentration of the additive is from 0.01 to 5.0 (w/v) %.

In a preferred embodiment, the catalyst is selected one or more from the group consisting of pyridine, 4-dimethylaminopyridine, piperidine, 4-hydroxypiperidine, morpholine, N-methylmorpholine, cetyltrimethylammonium chloride, octadecyltrimethylammonium chloride, cetyltrimethylammonium bromide, and octadecyltrimethylammonium bromide. In the polar solvent solution, the content of the catalyst is from 0.01 to 2.0 (w/v) %. The catalyst can act as an aid in regulating the rate of interfacial polymerization.

According to the additive in the polar solvent of the present invention, a single compound may be capable of performing multiple functions. For example: cetyltrimethylammonium chloride, octadecyltrimethylammonium chloride, cetyltrimethylammonium bromide and octadecyltrimethylammonium bromide, etc. The action of the surfactant, in turn, has the function of a catalyst. Further, pyridine, 4-dimethylaminopyridine, piperidine, 4-hydroxypiperidine, morpholine, N-methylmorpholine, tetramethylethylenediamine, etc., can also perform various functions.

According to a preferred embodiment of the method according to the invention, the auxiliaries may also comprise further constituents. Among the additives selected from at least one of a cosolvent, a complexing agent, and a phase transfer agent, a single additive (or additive) can serve multiple functions. Suitable auxiliaries herein are at least one selected from the group consisting of alcohols, ethers, aldehydes, acid anhydrides, ketones or esters, and representative components include: methanol, ethanol, ethylene glycol, propanol, and different Propyl alcohol, sorbitol, glycerin, glycidol, acetone, 2-butanone, cyclohexanone, diethyl ether, ethylene glycol dimethyl ether, diglycidyl ether, ethylene glycol diglycidyl ether, pentaerythritol glycidyl ether, pentane Dialdehyde, glyoxal, succinic anhydride, maleic anhydride, tetrahydrofuran, 1,4-dioxane, chloroform, methyl acetate, ethyl acetate, trimethyl phosphate, triethyl phosphate, phosphoric acid Propyl ester, tributyl phosphate, triamyl phosphate, triphenyl phosphate, N,N-dimethylformamide, N,N-dimethylacetamide, N-methylpyrrolidone, dimethyl sulfoxide or sulfolane Wait. Preference is given to acetone, isopropanol, ethyl acetate or dimethyl sulfoxide. The concentration of the additive selected from at least one of a cosolvent, a catalyst, a complexing agent and a phase transfer agent is usually from 0.01 to 5.0 (w/v) %, preferably from 0.05 to 2.0 (w/v) %.

According to a preferred embodiment of the method according to the invention, the post-treatment comprises heat treatment, preferably at a temperature of from 50 to 150° C. for 1 to 20 minutes. Heat treatment oven or the like may be used to achieve an aqueous operation. The heat treatment can bring improved semipermeable membrane performance, such as increased water flux and salt rejection performance of semipermeable polyamide membrane.

According to a preferred embodiment of the method of the present invention, after the heat treatment, further comprising at least one selected from the group consisting of the macromolecule, the surfactant, the zwitterionic compound, the acid or a base The polar solvent solution is treated, wherein the pH of the solution used can be from 2.0 to 12.0, and the temperature can be from 20 to 50° C. The post-treatment can increase the water permeation flux, salt rejection and anti-pollution performance of the polyamide semipermeable membrane.

The method provided by the invention can continuously produce a Turing structure polyamide semipermeable membrane, which is easy to realize in an industrial production process. The method comprises coating a porous substrate surface layer with a polar solvent solution containing at least two amine groups and a macromolecule solution of a polar solvent and a compound containing at least two acid halide groups; and a solution containing at least two amine groups The polar solvent solution of the compound and the macromolecule is contacted and reacted with a solution of a non-polar solvent containing at least two acid halide groups. According to a preferred embodiment of the method of the present invention, the method specifically includes:

S1. coating a surface of the porous substrate with a first solution to remove excess solution to form a liquid membrane on the surface of the porous substrate;

S2. contacting the liquid membrane in step S1 with a second solution to form a crosslinked separation layer by interfacial polymerization; and S3. The product in the step S2 is post-treated to obtain a polyamide semipermeable membrane having a three-dimensional nano-scale Turing structure.

Wherein, when the first solution is a solution of a compound containing at least two amine groups and a macromolecule of a polar solvent, the second solution is a non-polar solvent solution of a compound containing at least two acid halide groups; when the first solution In the case of a non-polar solvent solution of a compound containing at least two acid halide groups, the second solution is a solution of a compound containing at least two amine groups and a macromolecular polar solvent. That is, the step of the coating does not need to be in a specific order, and the preferred order is to first coat a porous substrate with a solution of a compound containing at least two amine groups and a macromolecule, and then apply at least two acid halides. A non-polar solvent solution of the compound of the group. The coating can be achieved by spraying, rolling or dipping. The compound containing at least two acid halide groups is dissolved in a non-polar solvent for coating. Further, the compound monomer containing at least two acid halide groups may be transported from a gas phase (for example, a saturated vapour of a compound monomer containing at least two acid halide groups).

According to the study by the inventors, the process of performing the interfacial polymerization process has a significant effect on the structure of the polyamide semipermeable membrane. In order to obtain the Turing structure, it is preferred to carry out stirring or sonication of each reaction solution for a certain period of time and intensity. After a uniform solution is formed, it is cooled to the desired temperature.

According to a preferred embodiment of the invention, in the step S1, the residence time of the polar solution on the porous substrate has a certain effect on the structure of the semipermeable membrane of the polyamide. The residence time may be 10~600 s, preferably 20~30 s. The method of removing excess solution may be carried out by a method in the prior art; for example, removing excess solution by using an air knife, a squeeze roll or an oven to form an extremely thin liquid membrane on the porous substrate. The coated porous substrate can be treated to control the concentration of the polyamine monomer or various auxiliaries participating in the reaction prior to contact with the non-polar solvent solution of the compound containing at least two acyl halide groups. For example, at a temperature of 25° C. and a relative humidity of 60%, the residence time in the atmosphere can be from 10 to 600 s.

According to a preferred embodiment of the present invention, the non-polar solvent solution of the compound containing at least two acid halide groups is contacted with a polar solution of a compound containing at least two amine groups, the at least two the compound of the acid halide group and the compound containing at least two amine groups undergo polymerization at the interface of the two phases. The reaction time may be a reaction time commonly used in the art, such as a reaction time of from 10 to 600 s, preferably from 20 to 300 s.

According to a preferred embodiment of the present invention, after the reaction, the excess solution is removed by a method in the prior art, such as an air knife, a squeeze roll or an oven, and after a certain period of heat treatment, the preferred temperature is 50~150° C., residence time is 1~20 min, (heat treatment can be achieved by using the oven or water-soluble operation) to form a polyamide semipermeable membrane with nano-scale Turing structure. The polyamide nano-separation layer provides the ability to selectively permeate the semipermeable membrane, and can effectively separate the solvent and the solute in the mixed solution.

The residence time of the coating process, the time and temperature of the interfacial polymerization reaction, the time and temperature of the post-treatment (including heat treatment) have a significant effect on the formation of the Turing structure and the separation performance of the semipermeable membrane.

In order to obtain a polyamide semipermeable membrane having a good Turing structure, it is preferable to use a porous substrate having a suitable pore size and distribution, to use a solution containing a reactive monomer and various additives in suitable concentration, to pretreat the solution for a certain time and strength, and/or to optimizate residence time or reaction temperature of each step are also preferable.

According to the present invention, the Turing structure is obtained in situ by interfacial polymerization, and the chemical composition of the semipermeable membrane contains the selected macromolecule. The method provided by the invention can continuously produce a Turing structure polyamide semipermeable membrane, which is easy to realize in an industrial production process.

According to another aspect of the present invention, there is further provided with the use of the above polyamide semipermeable membrane or the polyamide semipermeable membrane prepared by the above method in the field of fluid separation.

The polyamide semipermeable membrane according to the present invention has a three-dimensional nano Turing structure, which has good separation performance, high permeation flux to water and good salt rejection property. The membrane can maintain high density under relatively low pressure. The polyamide semipermeable membrane exhibits high anti-pollution performance, and thus has a broad application prospects in the field of fluid separation. The use of the polyamide semipermeable membrane according to the invention in the field of water treatment and/or in the field of seawater desalination has good prospects.

According to the present invention, the Turing structure exists in the polyamide separation layer and provides the ability of the separation layer to selectively permeate the solvent, thereby effectively separating the solvent and the solute in the mixed solution. At the same time, the Turing structure can enhance the separation performance and anti-pollution performance of the polyamide semipermeable membrane. When the polyamide semipermeable membrane of the present invention is a positive/reverse osmosis membrane, the permeation flux to water is not low at a test temperature of 25° C., a pressure of 15.5 bar (225 psi), and a concentration of NaCl of 2000 ppm. At 1.0 (m3/m2·d), the rejection of the salt is not less than 99.0%. When the polyamide semipermeable membrane of the present invention is a nanofiltration semipermeable membrane, the water permeation flux is not lower than the test temperature at a test temperature of 25° C., a pressure of 4.8 bar (70 psi), and a MgSO 4 concentration of 2000 ppm. 1.2 (m3/m2·d), the rejection of salt is not less than 98.0%.

According to a preferred embodiment of the method according to the invention, the semipermeable membrane may also be a polyurea semipermeable membrane, a product of interfacial polymerization from polyisocyanates and polyamines.

Most preferably, in the present application, piperazine (PZ) and trimesoyl chloride (TMC) are selected as starting materials for the preparation of a polyamide semipermeable membrane (FIG. 13), wherein PZ is an activator and TMC is an inhibitor (Inhibitor). The reaction is initiated when the top surface of a porous polysulfone (PSU) substrate containing an aqueous solution of an activator is contacted with an organic solution of the inhibitor. Since the acid chloride has a very small solubility in water, the polymerization mainly occurs on the organic phase side of the interface. Initially, the activator reacts with a locally available inhibitor in the reaction zone, followed by diffusion to penetrate deeper into the reaction zone, and finally, a crosslinked polyamide membrane is formed in the pore opening region of the PSU substrate (FIG. 7). However, The inventors have found that a polyamide membrane formed only by conventional interfacial polymerization is not a Turing structure because there is no proper difference between the diffusion coefficients of the activator and the inhibitor. During the reaction, the aqueous solution of the activator is confined within the nano-sized pores of the polysulfone (PSU) substrate surface, where physical blockage prevents the dispersed aqueous phase from moving and slows the transport of the activator. The diffusion coefficient of organic molecules is about 10-5 cm2·s-1, and the diffusion coefficient of the dispersed aqueous phase in the organic phase can be as low as 10-6 cm2·s-1. When a certain amount of macromolecular PVA is added to an aqueous solution, it interacts with the activator by hydrogen bonding and increases the viscosity of the solution, further reducing the rate of diffusion of the activator (FIG. 14). By physically blocking chemical interaction and synergy, an appropriate system to meet the difference between the diffusion coefficient of activators and inhibitors, leading to spreading instability and generate scattered driven nano-scale spots (FIG. 15 left) and stripes (FIG. 15 Right).

The present invention has beneficial effects over the prior art as follows:

The invention constructs the world's first nanofiltration membrane of polyamide polymer material from the surface of polysulfone, which is based on polymer science, and the "Turing structure" moves from mathematical biology theory to water treatment. A key step for the practical application of the representative. Different from the prior art, the present invention utilizes one or more macromolecules and nanoparticles to specifically change the diffusion coefficient of the monomer, thereby realizing the regulation of the "reaction-diffusion" process of the interfacial polymerization.

2. Control the diffusion coefficient difference, design the two-phase system of interface polymerization, control the key factors, and obtain the membrane with Turing structure of various materials. Using this regulation technique, the inventors have invented a semipermeable membrane with a Turing structure that maintains a high level of salt ion selection compared to existing semipermeable membranes. At the same time, the membrane flux (125 L·m-2·h-1) was greatly increased, breaking the upper limit of the performance of the existing membrane materials and the theoretical upper limit of the membrane properties prepared by the prior art (FIG. 1).

3. The semipermeable membrane with Turing structure has better anti-pollution performance (anti-pollution flux drop <20%) compared with the existing membrane material.

4. Compared with the existing membrane materials, the Turing structure of this membrane material has a larger water flux per unit area (125 L·m-2·h-1), which can save the base membrane. It can reduce the membrane operating pressure (4.8 bar) and meet the requirements of green environmental protection.

5. Compared with the existing membrane forming technology, the strategy for controlling the diffusion coefficient proposed by the present invention is easy to implement based on the existing production conditions and can be easily integrated into the existing membrane forming process, and the technology does not need to be updated. The reaction equipment in the prior art can adjust the diffusion coefficient of the semipermeable membrane synthetic monomer only by adding one or more additives in the interfacial polymerization system, which makes the technology can be easily integrated into the existing In the production pipeline, without further investment in more costs, it has far-reaching practical significance and commercial value.

BRIEF DESCRIPTION OF THE DRAWINGS

FIG. 2-1, FIG. 2-2, and FIG. 2-3 are schematic diagrams of common Turing structures.

FIG. 3 is a schematic diagram of how an activator and an inhibitor react with each other under specific conditions to produce a spatiotemporal fixed structure.

FIG. 28 and FIG. 29 are respectively TS-I membrane and the TS-II membrane of XPS spectra.

FIG. 30 is a graph showing the elemental composition and contact angle test results of the TS-I membrane, the TS-II membrane, and the conventional polyamide membrane.

FIG. 31 is an infrared spectrum analysis of a conventional polyamide membrane.

DETAILED DESCRIPTION OF THE INVENTION

Figure 1:
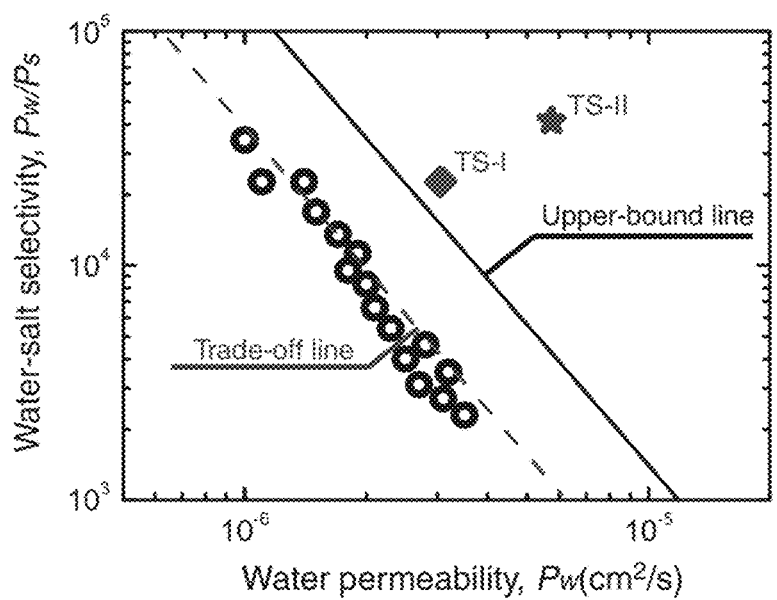
FIG. 1 is a comparison of the desalination performance of the membrane material prepared by the present invention with the reported membrane material properties and the theoretical properties of the membrane material. The abscissa of FIG. 1 represents the water permeation Pw (Water Permeability), and the ordinate represents water. The ratio of the permeation amount Pw to the salt permeation amount Ps (Water-salt selectivity, Pw/Ps).
Figures 1, 2:
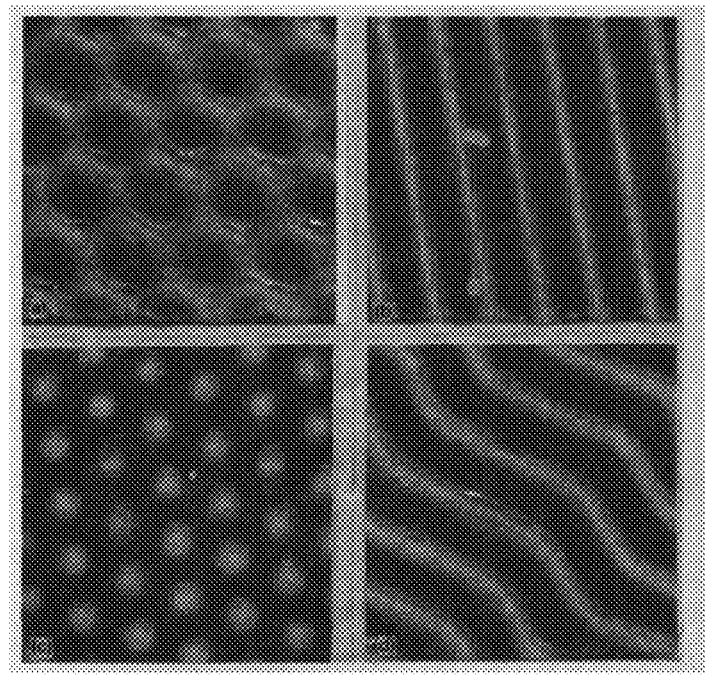
Figure 2:
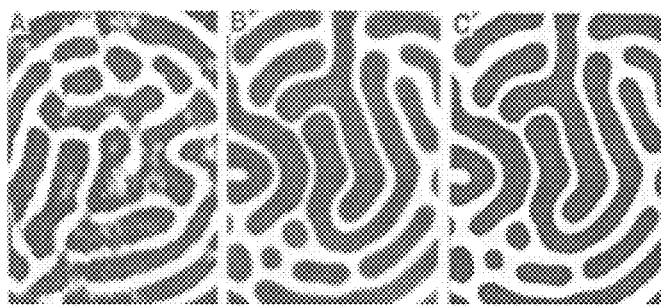
Figures 2, 3:
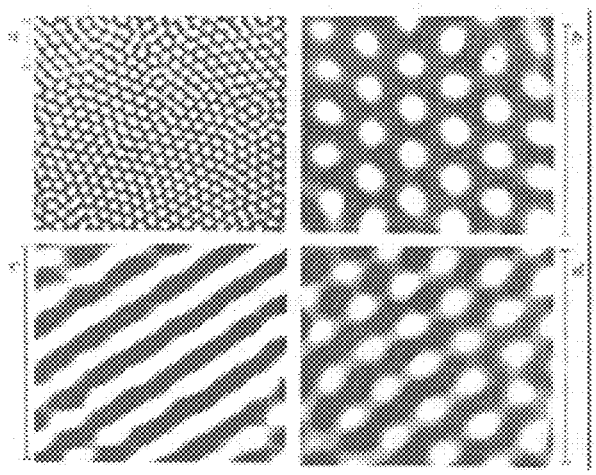
Figure 3:
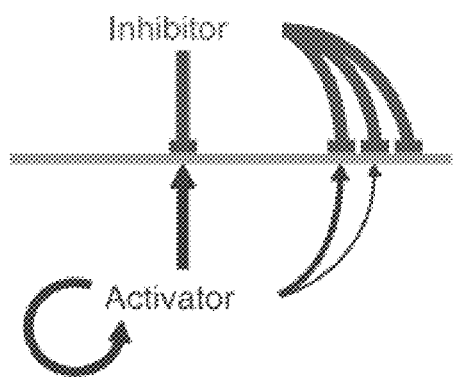
Figure 4:
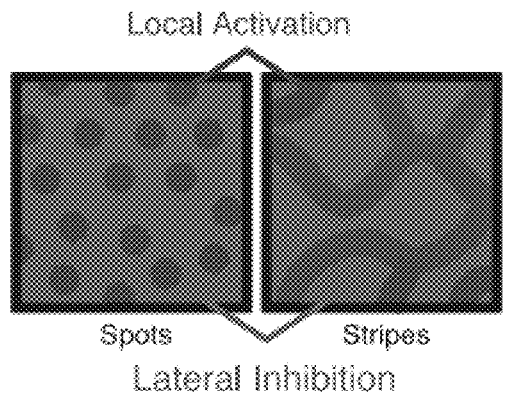
FIG. 4 is a schematic illustration of the principle of "local activation and lateral inhibition" resulting in the creation of a Turing structure.
Figure 5:
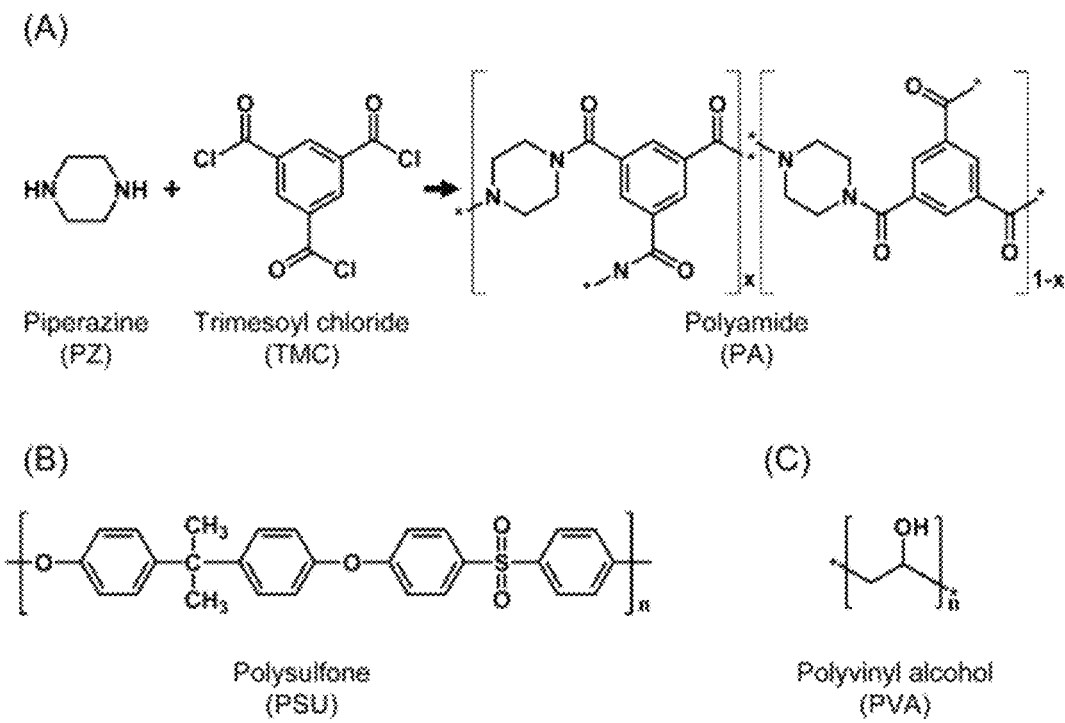
FIG. 5 is a schematic diagram of the principle of interfacial polymerization for typical membrane synthesis.
Figure 6:
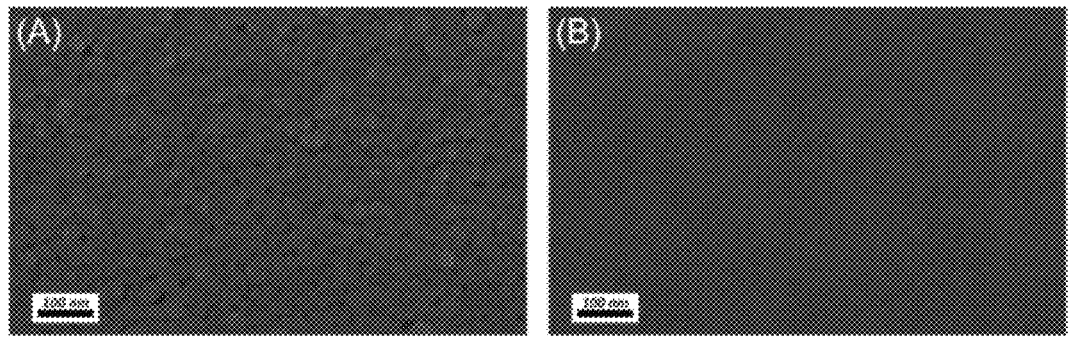
FIG. 6 is a scanning electron microscopy (SEM) image of an insoluble polyamide (PA) membrane (A pore type, B dense type).
Figure 7:
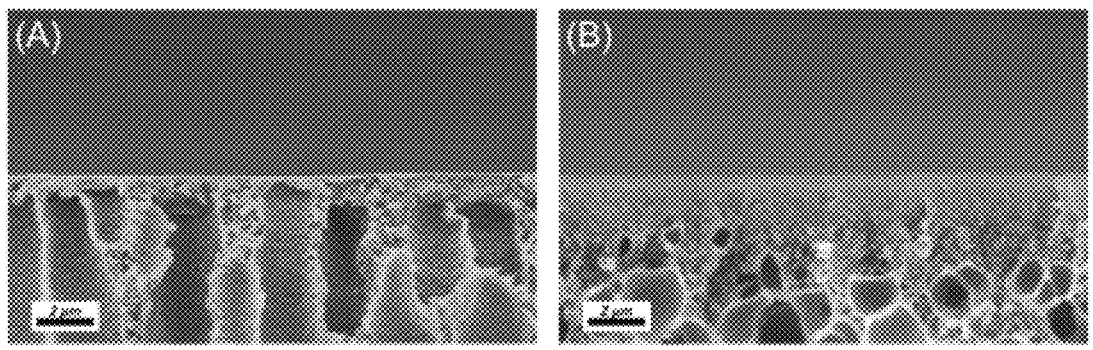
FIG. 7 is a scanning electron microscopy (SEM) image of an insoluble polyamide (PA) membrane (including a substrate layer) (A pore type, B dense type).
Figure 8:
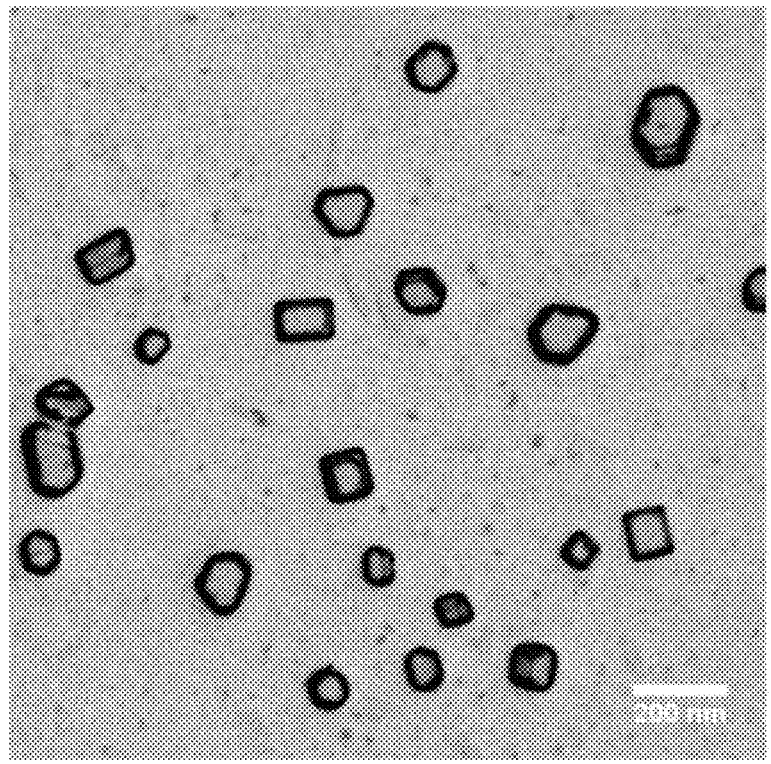
FIG. 8 is a transmission electron micrograph of a polyamide semipermeable membrane of a nanopopular structure according to Example 14 of the present invention.

The invention is further illustrated in detail by the following examples and comparative examples, but the invention is not limited to the embodiments described below. First, an evaluation method of the structure and properties of the semipermeable membrane will be described.

Semipermeable Membrane Structure

Transmission electron microscopy (TEM) can be used to observe whether the nano-separation layer of the polyamide semipermeable membrane forms a Turing structure. It can also be characterized using a variety of techniques such as scanning electron microscopy (SEM) or atomic force microscopy (AFM).

Semipermeable Membrane Performance

The evaluation indicators are water permeation flux and salt rejection. It was measured at a temperature of 25° C. and a salt concentration of 2000 ppm. All tests were performed 30 minutes after the device was run to ensure a stable test process. The semipermeable membrane of the RO type was tested at a pressure of 15.5 bar (225 psi) using an aqueous NaCl solution; for a semipermeable membrane of the NF type, the test pressure was 4.8 bar (70 psi) and tested with an aqueous solution of MgSO4. The conductivity of the permeate and the feed solution were separately measured by a conductivity meter, and the rejection was calculated using the obtained results and a standard curve.

Water Permeate Flux

Defined as the volume of a solution that passes through a semipermeable membrane per unit area per unit time. The unit of water permeation flux used in the present invention is (m3 m2·d-1), that is, (solution volume/semipermeable membrane area× test time).

Salt Retention Rate

Defined as the percentage of the dissolved mass of the solution after passing through the semipermeable membrane as a percentage of the total amount of the solute in the solution. It is calculated by the formula (1− salt concentration in permeate/salt concentration in the feed liquid)× 100%.

Anti-Pollution Performance

First, the water permeation flux and the salt rejection of the semipermeable membrane were measured, and then 100 ppm casein was added to the test solution for the antifouling performance test. The water permeation flux and the salt rejection of the semipermeable membrane were measured again after 6 hours of operation. In the description of the examples, the test results of the semipermeable membrane anti-contamination performance are given as a percentage of the normalized flux decrease. It is calculated by the formula (1− water permeation flux at the end/initial water permeation flux)×100%.

Diffusion Coefficient Detection

Firstly, the diffusion coefficient of micro-nano droplets in the oil phase is determined. The surfactant is used to disperse water into the homogeneous emulsion in the oil phase, and then two-dimensional nuclear magnetic resonance sorting of water and oil is determined by diffusion-order nuclear magnetic resonance spectrometer. The spectrum (2D DOSY NMR) was used to calculate its diffusion coefficient. Macromer, monomer diffusion coefficient measurement: Oita sub-monomer aqueous arranged different concentrations, measuring the two-dimensional NMR spectroscopy sort, and to determine the diffusion coefficient. In particular, the relative error of the diffusion coefficient is ±50%.

Example I

Figure 14:
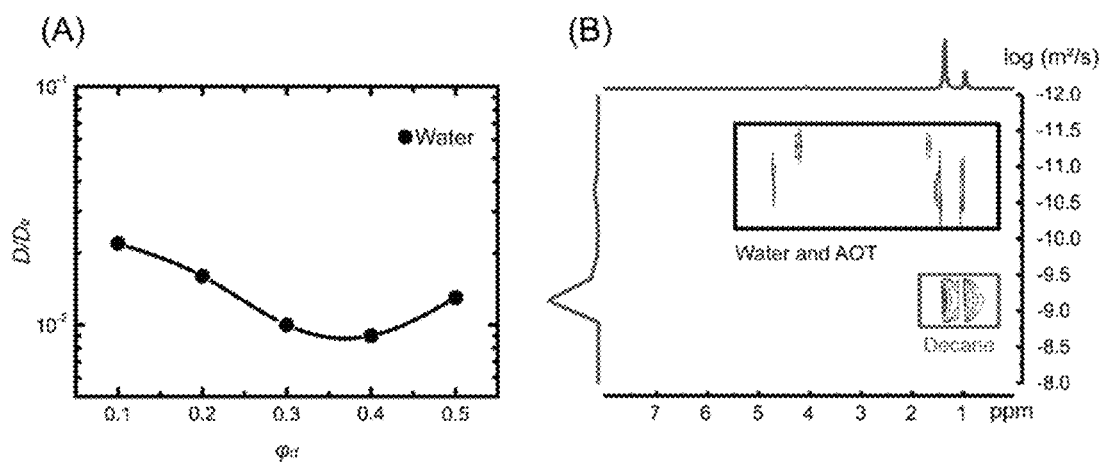
FIG. 14 is a graph showing the diffusion coefficient of the present invention (A: a function of water diffusion coefficient and droplet volume fraction (water plus surfactant) in a water-AOT-decane microemulsion, where D0 is in the absence of AOT and decane. Diffusion coefficient of water in the case of alkane B: Nuclear magnetic resonance sequencing of water, AOT and decane).

Preparation of TS-I Membrane:

The TS-I membranes prepared by the interfacial polymerization reaction of a polysulfone porous substrate membrane with the solution A into contact for 5 after removal minutes. After staying in the atmosphere for about 60 s, it was contacted with the B solution for 60 s and then treated at 80'C for 10 min to obtain a TS-I membrane. In particular, solution A contains: 2.0 (w/v) % of 1,3-phenylenediamine, 2.0 (w/v) of sodium phosphate, 0.5 (w/v) of 3-aminobenzoic acid, 0.2 (W/V) % of PVA and 0.1 (W/V) % of sodium dodecylbenzenesulfonate, in particular, when the diffusion coefficient $DA=1.9953\times10^{-6}$ cm2·s-1; solution B contains: 0.1 (w/v) % of 1,3,5-benzenetricarboxylic acid chloride, 0.5 (w/v) % acetone, in particular, the diffusion coefficient $DB=7.0795\times10^{-5}$ cm2·s-1 at this time; DB/DA=35.48 (see FIG. 14).

Example II

Preparation of TS-II Membrane:

The TS-II membranes prepared by the interfacial polymerization reaction of the porous substrate with a solution of the polyimide membrane A contact duration 10 after removal minutes. After staying in the atmosphere for about 60 s, it was contacted with the B solution for 180 s and then treated at 120° C. for 10 min to obtain a TS-II membrane. In particular, solution A contains: 2.0 (w/v) % of 1,3-phenylenediamine, 1.0 (w/v) % of sodium phosphate, and 1.0 (w/v) of L-leucine benzyl ester. P-toluenesulfonic acid, 0.3 (w/v) % polyvinylpyrrolidone and 0.05 (w/v) % cetyltrimethylammonium chloride, in particular, the diffusion coefficient $DA=3.8581\times10^{-7}$ cm2·s-1; solution B Contains: 0.1 (w/v) % of 1,3-phthaloyl chloride, 0.5 (w/v) % of acetone, 0.2 (w/v) of dimethyl sulfoxide, in particular, the diffusion coefficient at this time $DB=3.4334\times10^{-5}$ cm2·s-1; DB/DA=88.99 (see FIG. 14).

Comparative Example I

Figures 37, 38:
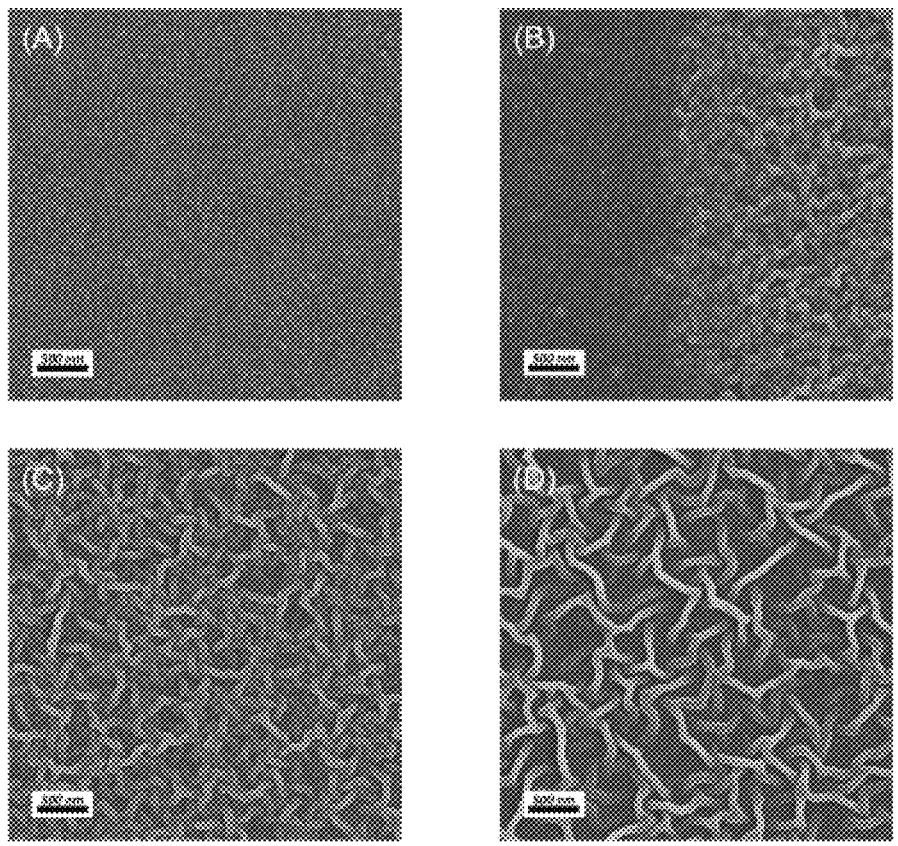
FIG. 37 is an SEM image of a polyamide membrane prepared by adding different PVA contents, [TMC]=8 mM, [PZ]=23 mM. (A) 0 mM, (B) 12 mM, (C) 23 mM, (D) 34 mM.
FIG. 38 is a surface zeta potential analysis.

PA-I membranes prepared by the interfacial polymerization reaction of a polysulfone porous substrate membrane with the solution A into contact for 5 after removal minutes. After staying in the atmosphere for about 60 s, it was contacted with the B solution for 60 s and then treated at 80° C. for 10 min to obtain a PA-I membrane. In particular, solution A contains: 2.0 (w/v) % of 1,3-phenylenediamine, 2.0 (w/v) % of sodium phosphate, in particular, at this time, the diffusion coefficient $DA=1\times10-5$ cm2/s-1; Solution B contains: 0.1 (w/v) % of 1,3,5-benzenetricarboxylic acid chloride, in particular, the diffusion coefficient $DB=1\times10-5$ cm2·s-1; DB/DA=1 (see FIG. 38).

Comparative Example II

PA-II membranes prepared by the interfacial polymerization reaction of the porous substrate with a solution of the polyimide membrane A contact duration 10 after removal minutes. After staying in the atmosphere for about 60 s, it was contacted with the solution B for 180 s and then treated at 120° C. for 10 min to obtain a PA-II membrane. In particular, solution A comprises: 2.0 (w/v) % of 1,3-phenylenediamine, 1.0 (w/v) % of sodium phosphate, in particular, at this time, the diffusion coefficient $DA=1\times10-5$ cm2·s-1; solution B contains: 0.1 (w/v) % of 1,3-phthaloyl chloride, in particular, the diffusion coefficient $DB=1\times10-5$ cm2·s-1; DB/DA=1.

Figure 15:
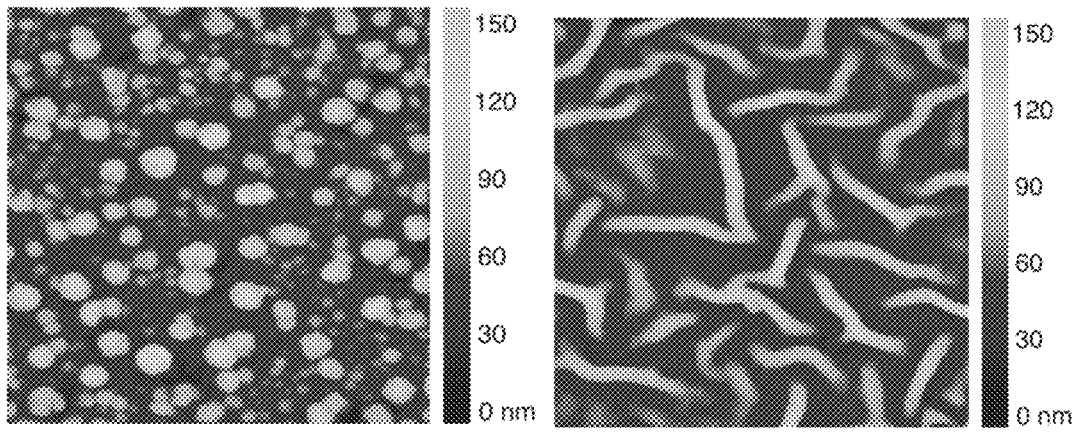
FIG. 15 is an AFM topographical view of a Turing PA membrane, wherein the bright yellow and orange regions correspond to the solid state nano-scale Turing structure formed.
Figure 16:
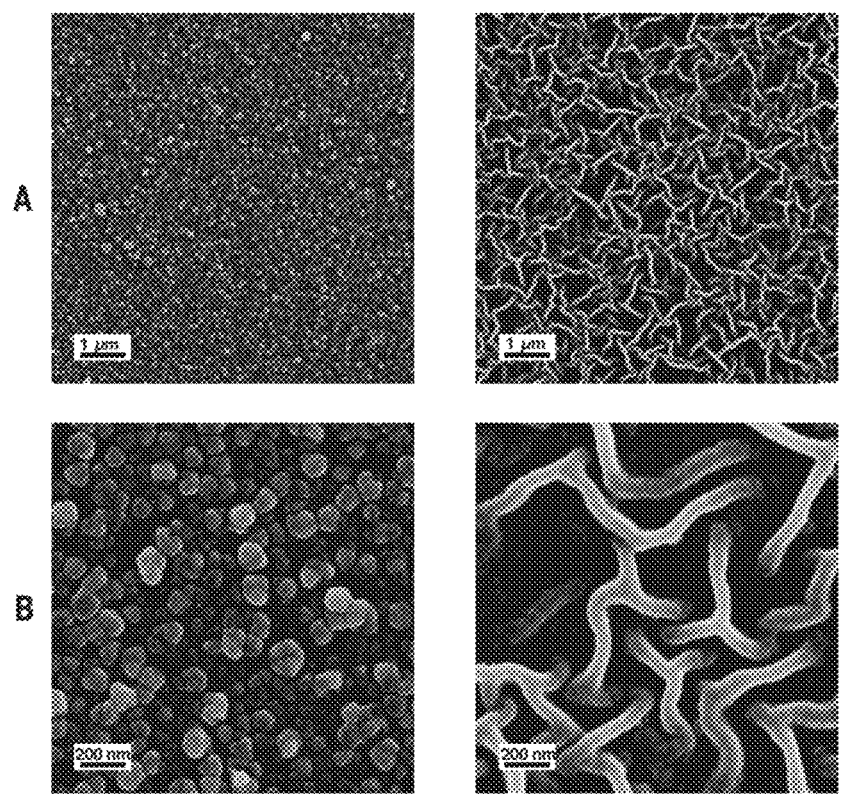
FIG. 16 is an SEM image of a uniform Turing structure (A: low resolution, large field of view; B: high resolution, small field of view).
Figure 17:
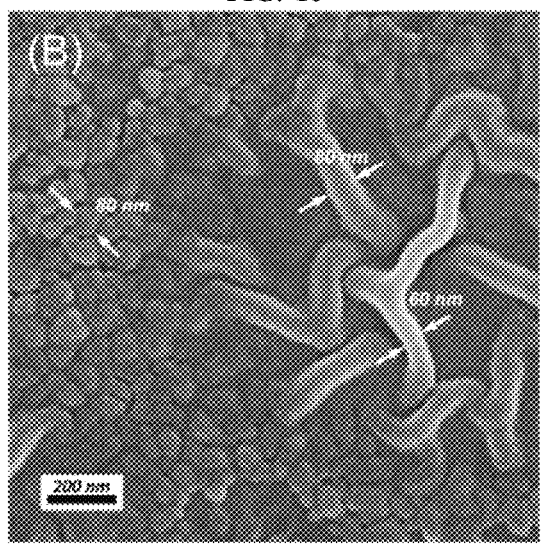
FIG. 17 is a scanning electron microscope (SEM) data measurement diagram of the Turing structure size of the membrane surface.
Figure 18:
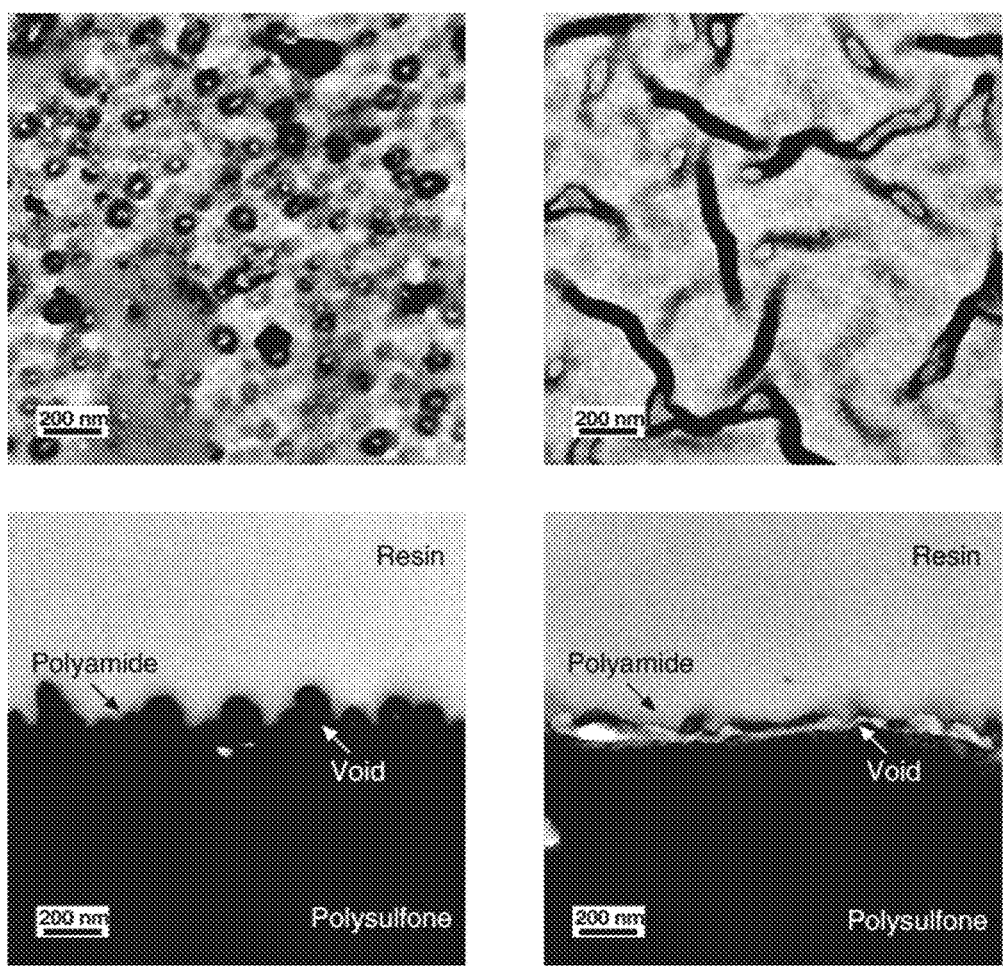
FIG. 18 is a projected projection view (TEM) of the membrane (top: cross-sectional TEM image; lower; internal features and three-dimensional morphology of the two structures.
Figure 19:
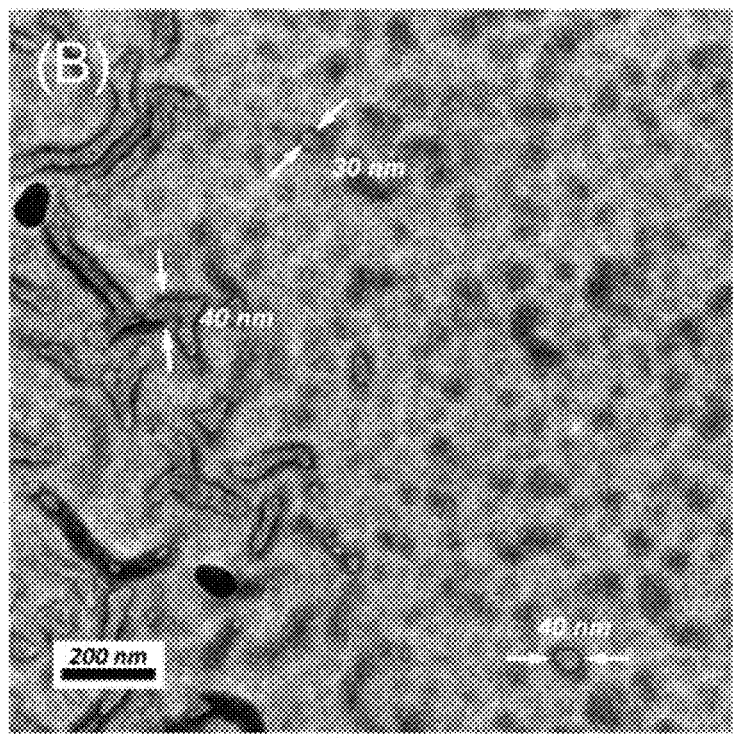
FIG. 19 is a transmission electron microscope (TEM) data measurement diagram of the Turing structure size of the membrane surface.

Atomic force microscopy (AFM) measurements showed that the surface of the membrane with a nano-scale spotted structure (TS-I) and the membrane with a striped Turing structure (TS-II) was relatively rough and uneven. Measuring the root mean square roughness (averagerootmeansquareroughnesses), respectively 22 and 32 nm, which is the traditional semiaromatic polyamide membrane having a substantially comparable and uniform smooth surface (FIG. 15 below). The speckle and fringe structures have nearly the same height, while the surface area increase of TS-II is approximately twice that of TS-I, indicating that the continuous fringe structure has a larger surface area relative to the discrete speckle structure. In order to further study the nano-scale Turing structure, the membrane was characterized by scanning electron microscopy (SEM) and transmission electron microscopy (TEM). The SEM image shows that the two structures are evenly distributed throughout the membrane (FIG. 16A), which is consistent with the AFM measurements. A closer look at the membrane surface (FIG. 16B) reveals that the nano-scale Turing structure usually consists of a close-packed hexagonal array or interconnected labyrinth networks with diameters ranging from 60 to 80 nm (see FIG. 17). TEM analysis not only presents external features on the surface of the membrane but also provides morphological information about the internal features of the structure. Photomicrographs of the projected area (above FIG. 18) and the cross-sectional TEM (bottom of FIG. 18) show that there are two types of voids in the Turing structure ranging from 30 to 40 nm in diameter (FIG. 19). The Turing PA membrane has a thickness of about 20 nm or less and is twice as thin as a conventional semi-aromatic PA membrane. Under three-dimensional conditions, the Turing structure is a bubble or tubular and resembles a Turing pattern in a BZ microemulsion system (Atomic force microscopy, AFM) measurements show that the surfaces of membranes with the nano-scale spotted (TS-I) and striped (TS-II) Turing structures are relatively rough and heterogeneous. The measured average root mean square roughnesses were 22 and 32 nm, The spotted and striped structures have virtually the same height, the surface area increase of TS-II is approximately two times greater than that of TS-I, suggesting that the continuous striped structures have a larger surface area relative to the discrete spotted structures in the scan area. To further investigate the nano-scale Turing structures, The membranes were characterized by scanning electron microscopy (SEM) and transmission electron microscopy (TEM) analyses. The SEM images show that both structures are uniformly distributed throughout the membranes, which is consistent with the corresponding AFM (Atomic Force Microscope)m A closer look at the membrane surfaces reveals that the nano-scale Turing structures generally consist of close-packed hexagonal arrays or interconnected labyrinthine networks, with diameters ranging from 60 to 80 nm. The TEM analyses not only present the external features on the surfaces of the membranes but also provide morphology information on the internal characteristics of the structures. Projected area and cross-sectional TEM micrographs show that there are two types of voids in the Turing structures, with diameters ranging from 30 to 40 nm. The thickness of the Turing-type PA membranes is about 20 nm or less, two times thinner than that of traditional semi-aromatic PA membranes. In three dimensions, the Turing structures are bubble or tube shaped, like Turing patterns in the BZ microemulsion system).

The inventors evaluated the separation performance of two membranes with nano-scale speckle (TS-I) and streak (TS-II) Turing structures by salt water desalination test and explored the structure-property relationship of these membranes for water purification. The water and salt transmission data show that both membranes exhibit excellent separation performance, exceeding the upper limit of water and salt separation of conventional nanofiltration membranes (FIG. 1). The amount of water permeability and selectivity are high water and salt, with the conventional polymer membrane "trade-off behavior". In contrast, a seesaw-like effect, "trade-off behavior" refers to an amount of high water permeability always leads to lower The selectivity of water and salt, that is, increasing the selectivity of water and salt is often at the expense of water permeation. Under the same test conditions, the tubular structural membrane TS-II exhibited higher water flux and close salt rejection than the bubble structured membrane TS-I. The water flux of the TS-II membrane is as high as 125 L, which is about twice the water flux of the TS-I membrane. This result is consistent with the surface area trend of the membrane, indicating that the Turing structure has a large influence on the water flux. Based on these results, the inventors believe that there must be some specific sites in the Turing structure with relatively high water permeability, and these high permeability sites can impart enhanced water transport properties to the membrane.

Figure 20:
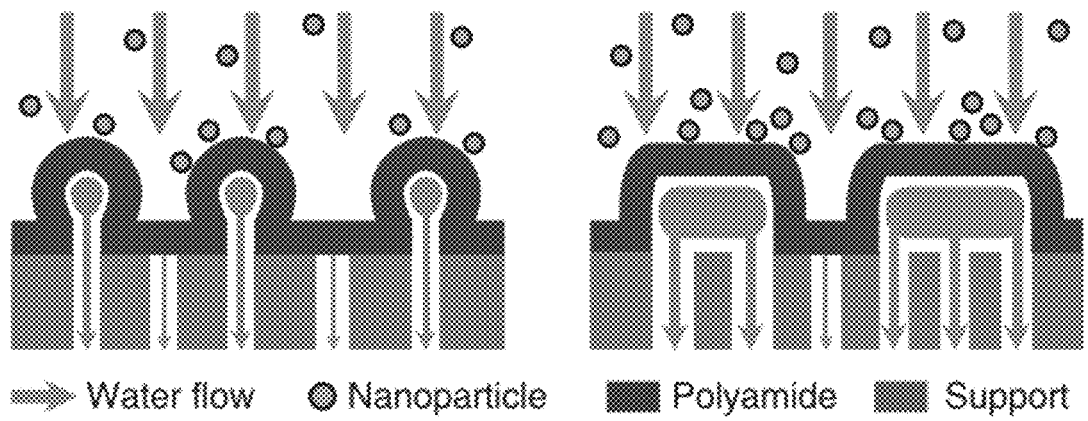
FIG. 20 is a schematic illustration of the water permeation site of the Turing structure membrane calibrated by gold nanoparticle (GNP) dynamic filtration experiments.
Figure 21:
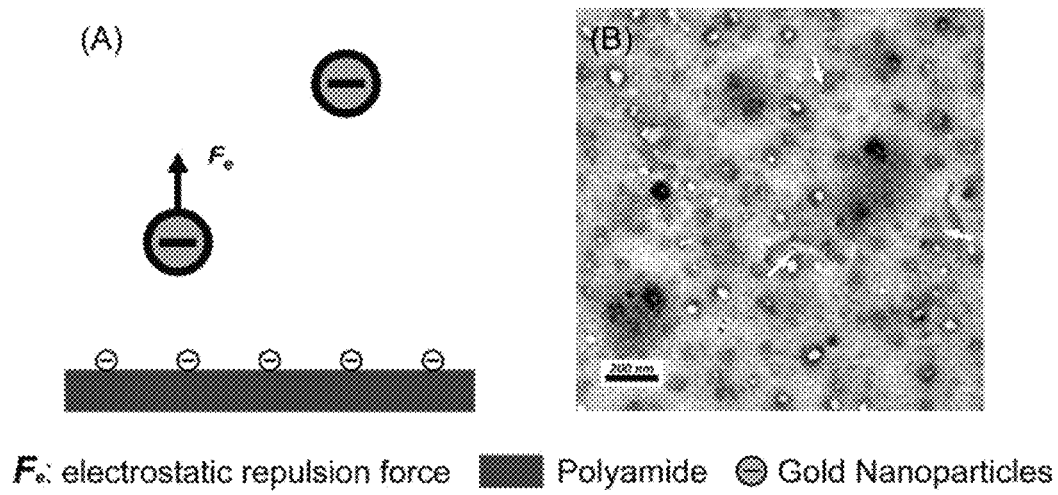
FIG. 21 is a schematic diagram of (A) gold nanoparticle static adsorption experiment and (B) TEM image of the sample after the static test (white arrow marks the position of gold nanoparticles).
Figure 22:
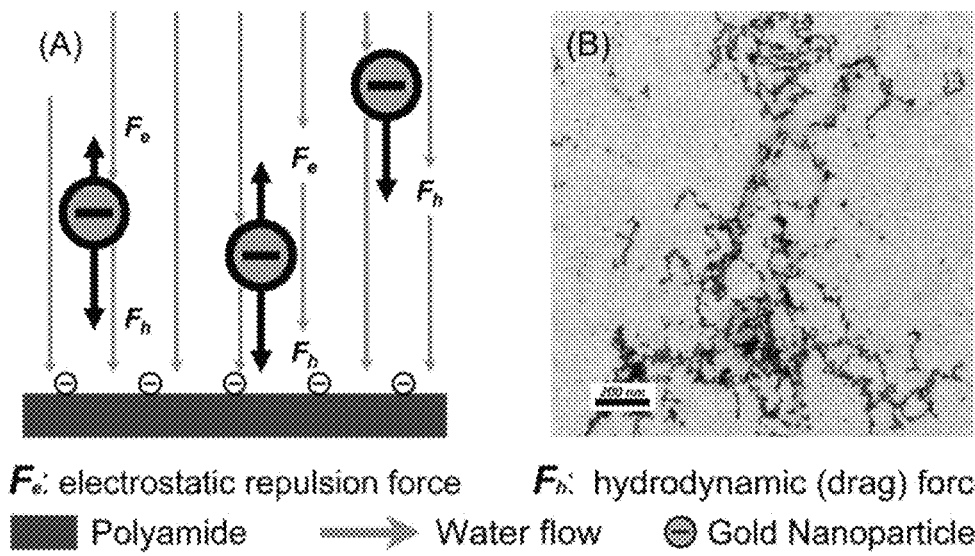
FIG. 22 (A) Schematic diagram of a dynamic filtration experiment using gold nanoparticles and (B) TEM image of the sample after the dynamic filtration test.
Figure 23:
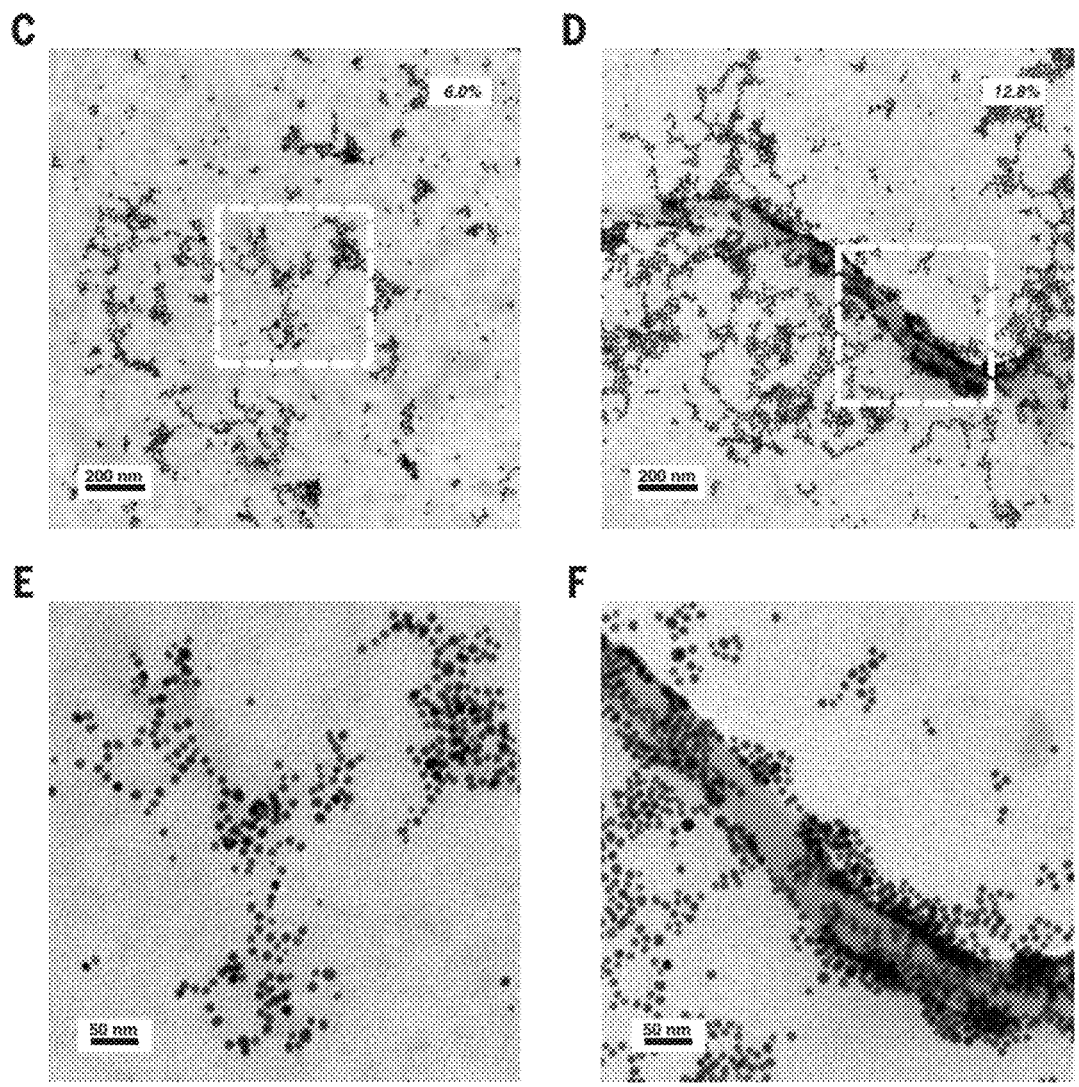
FIG. 23 is a schematic diagram showing the relationship between the nanoparticle deposition pattern and the spatial distribution of the Turing structure (the upper right corners of C and D give the gold nanoparticle coverage percentage; E and F are the high-resolution TEM images of the corresponding regions).
Figure 24:
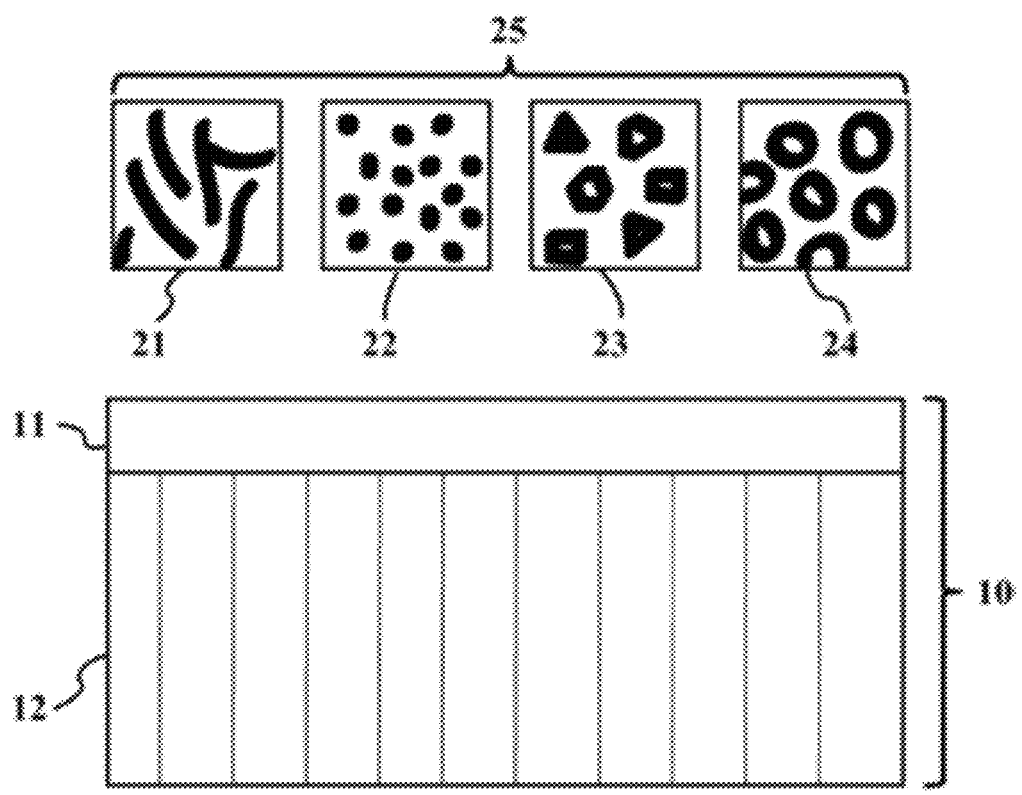
FIG. 24 is a schematic illustration of the surface and cross-sectional morphology of a Turing structure polyamide semipermeable membrane obtained by the present invention, the polyamide semipermeable membrane 10 comprising a polyamide nano-separation layer 11 and a porous substrate 12, a nano-separation layer 11 has a composition of one or more complex structures 25 of nanotubes 21, nanobubbles 22, nanopoplas 23, and nanorings 24.

To verify this phenomenon, the inventors used gold nanoparticles (GNPs) as probes in conjunction with a microscope to visually examine the spatial distribution of water permeation sites in the Turing structure membrane (FIG. 20). GNPs are negatively charged under neutral conditions and both membranes exhibit substantially the same surface charge behavior as GNPs. Therefore, in order for deposition to occur (FIG. 22), the repulsive force originating from the nanoparticle-membrane electrostatic interaction must be overcome. TEM micrographs show that the deposition of GNP is unevenly distributed on the surface of the membrane. The surface area of the nanoparticles of the TS-I and TS-II membranes were 6.0% (FIG. 23C) and 12.8% (FIG. 23D), respectively. GNP is deposited in specific regions of the membrane surface and forms clusters such that other regions of the surface are uncovered or have relatively few sparsely distributed GNPs. Most GNPs are deposited around bubbles (FIG. 23E) or tube structures (FIG. 23F), which provides visual evidence substrateing the presence of relatively high water permeability sites in the nano-scale Turing structure.

The inventors have discovered that a membrane having a nanoturing structure can be obtained by interfacial polymerization when appropriate initial conditions are produced. Microscopic characterization of the Turing structured polyamide membrane revealed that the spatial distribution of the relatively high water permeability sites is consistent with the nano-scale Turing structure. These unusual nanostructures are produced by diffusion-driven instability and have excellent transport properties in terms of water permeability and water-salt selectivity. It demonstrates that Turing structures can be produced by interfacial polymerization when appropriate initial conditions are created. Microscopic characterization of the Turing-structured membranes reveals that the spatial distribution of relatively higher water permeability sites agrees well with the corresponding Turing structures at the nano-scale. These unusual nanostructures, which are generated by diffusion-driven instability, enable outstanding transport properties in both water permeability and water-salt selectivity.

Figure 25:
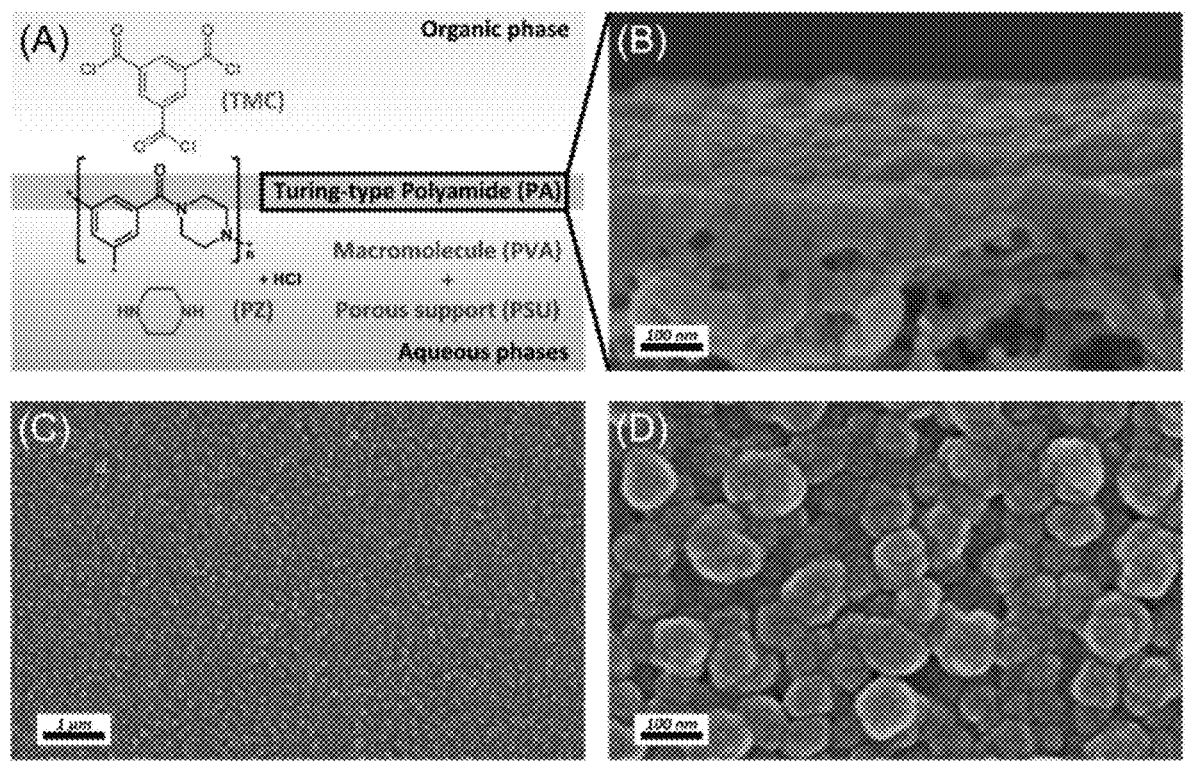
FIG. 25 is an SEM image of the interfacial polymerization process and membrane surface of the TS-I membrane.

FIG. 25 is an SEM diagram of the interfacial polymerization process (FIG. 25A) and the membrane surface of the TS-I membrane. The SEM image shows that the TS-I membrane has a cross section of the bubble structure (FIG. 25B), which is consistent with the TEM micrograph (FIG. 18) and has a uniform structure (FIG. 25C). The bubble shape is about 70 nm in diameter (FIG. 25D).

Figure 26:
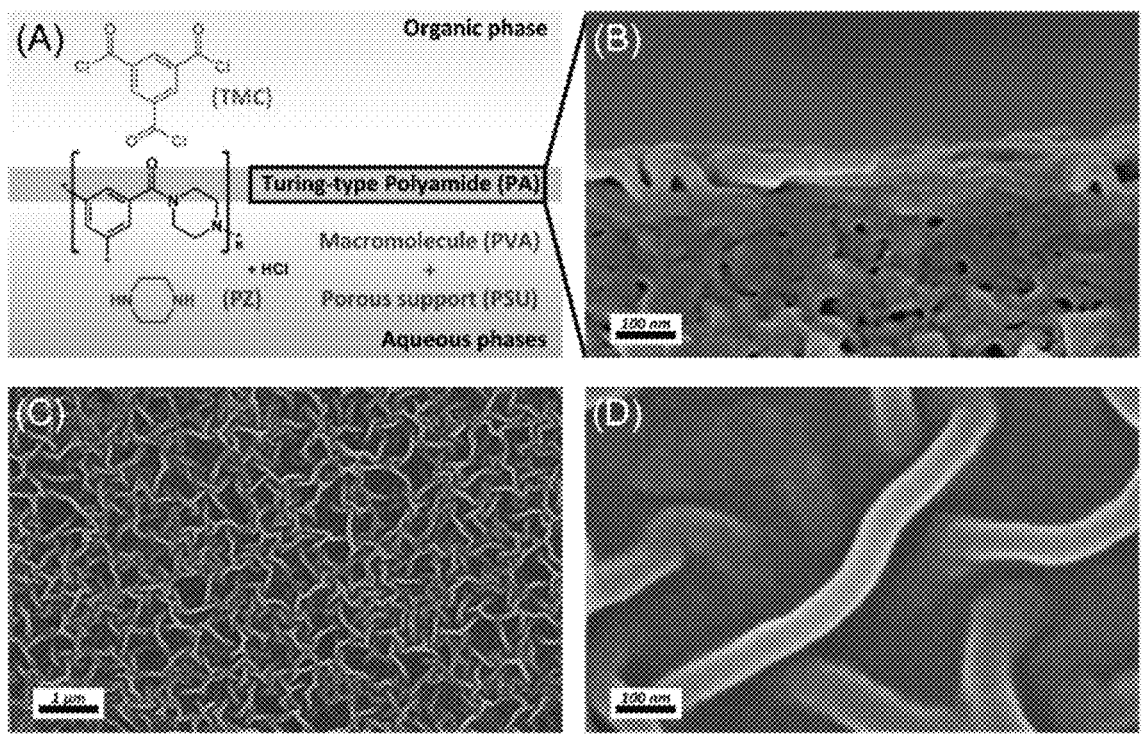
FIG. 26 is an SEM image of the interfacial polymerization process and membrane surface of the TS-II membrane.

FIG. 26 is an SEM diagram of the interfacial polymerization process of the TS-II membrane (FIG. 26A) and the membrane surface. The SEM image shows that the TS-II membrane has a tubular structure cross section (FIG. 26B), which is consistent with the TEM micrograph (FIG. 18, FIG. 19), the structure is evenly distributed (FIG. 26C), and the tubular Turing structure is about 70 nm in diameter (FIG. 26D)

Figure 27:
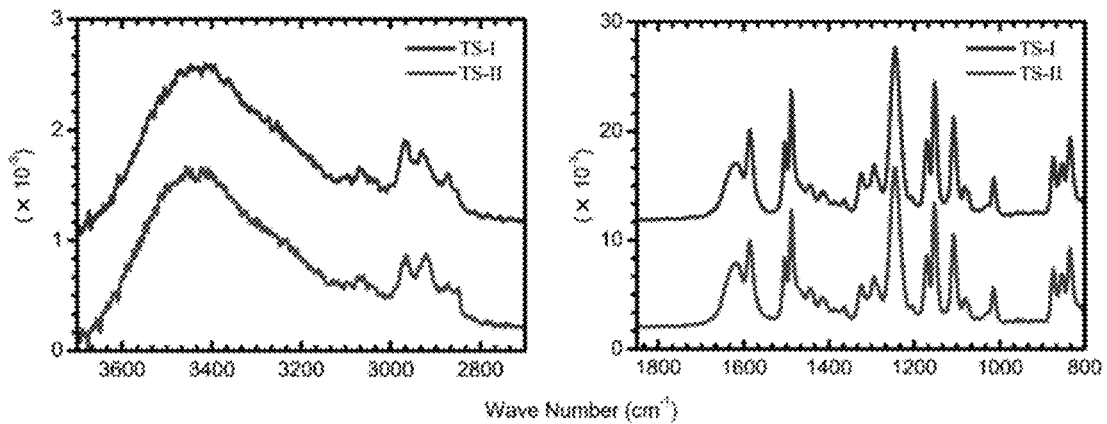
FIG. 27 is an ATR-FTIR spectrum of TS-I and TS-II membrane.

FIG. 27 is an ATR-FTIR spectrum of TS-I and TS-II. The spectra of TS-I and TS-II (FIG. 27A) The broad peak at 3400 cm-1 is the stretching vibration peak of OH and NH and the peak at 1630 cm-1 is related to the amide group.

Figure 28:
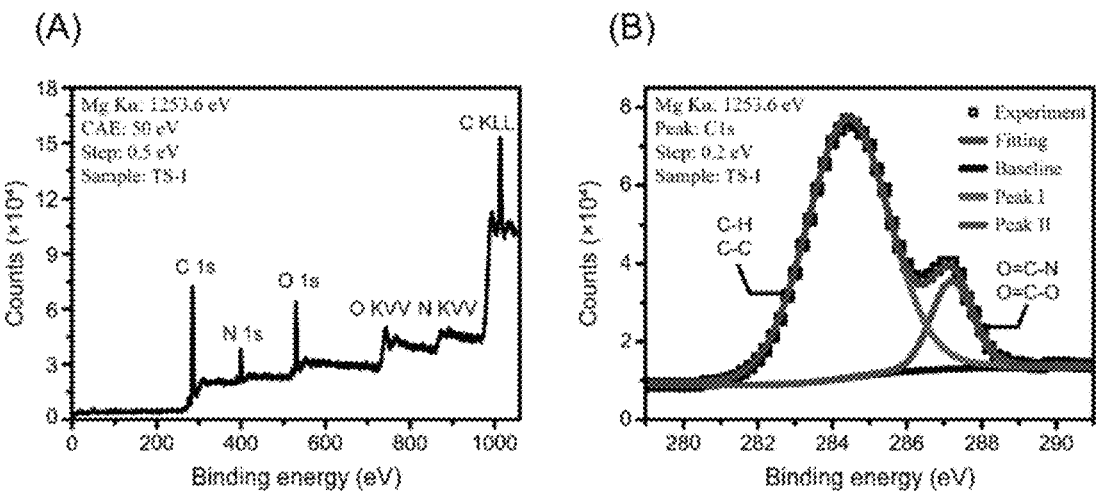
Figure 32:
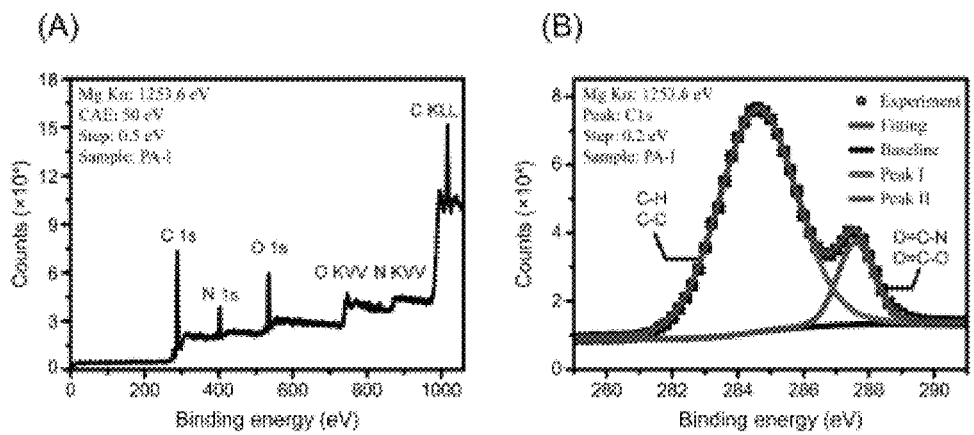
FIG. 32 is an X-ray spectroscopy (XPS) analysis of a conventional polyamide membrane.
Figure 33:
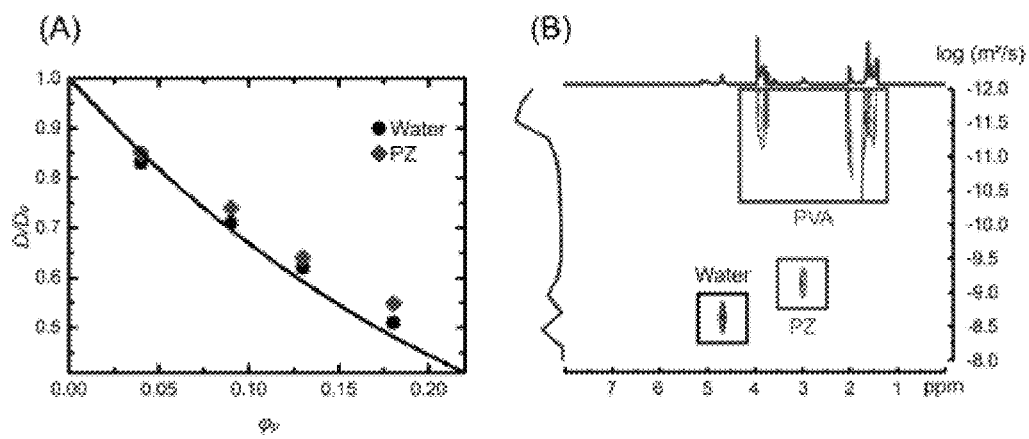
FIG. 33 is a diffusion coefficient test result. FIG. (A) shows the diffusion coefficient of small molecules in polyvinyl alcohol (PVA) solution as a function of the volume fraction of macromolecules, where D/D0 is the diffusion coefficient of water in the absence of PVA. FIG. (B) is a 2D nuclear magnetic ordering spectrum (DOSY NMR) of water and piperazine (PZ) in a macromolecular solution.
Figure 34:
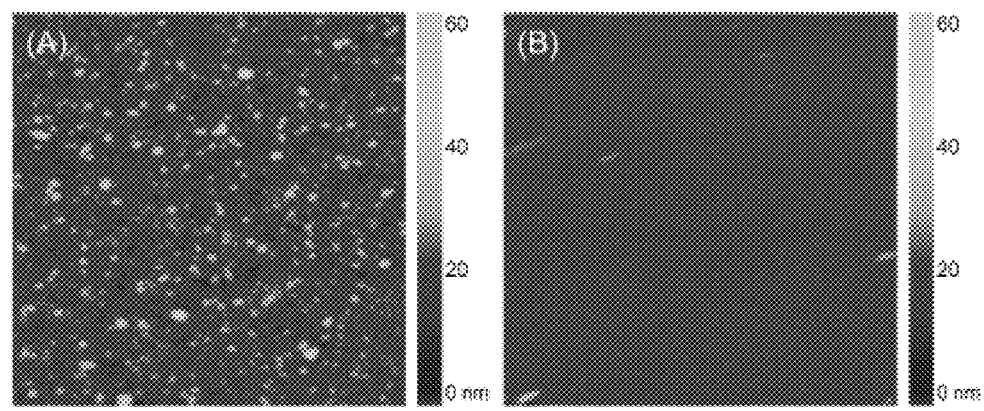
FIG. 34 is an AFM image of a conventional polyamide membrane (without Turing structure).
Figure 35:
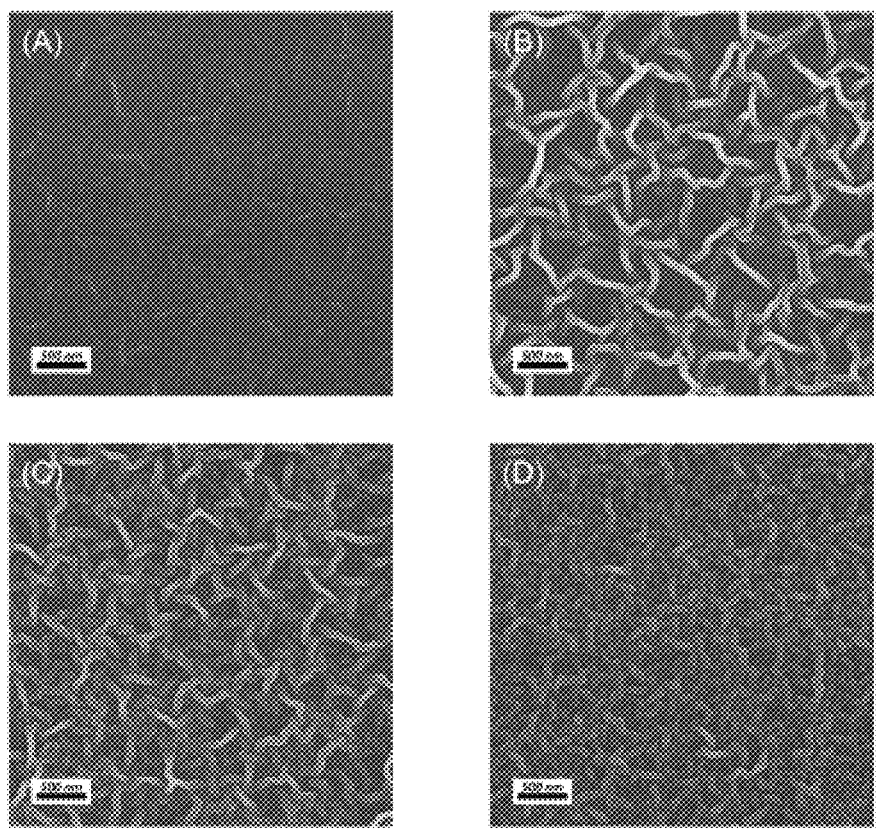
FIG. 35 is an SEM image of a polyamide membrane prepared by adding different PZ contents, [TMC]=8 mM, [PVA]=34 mM. (A) 12 mM, (B) 23 mM, (C) 35 mM, (D) 46 mM.
Figure 36:
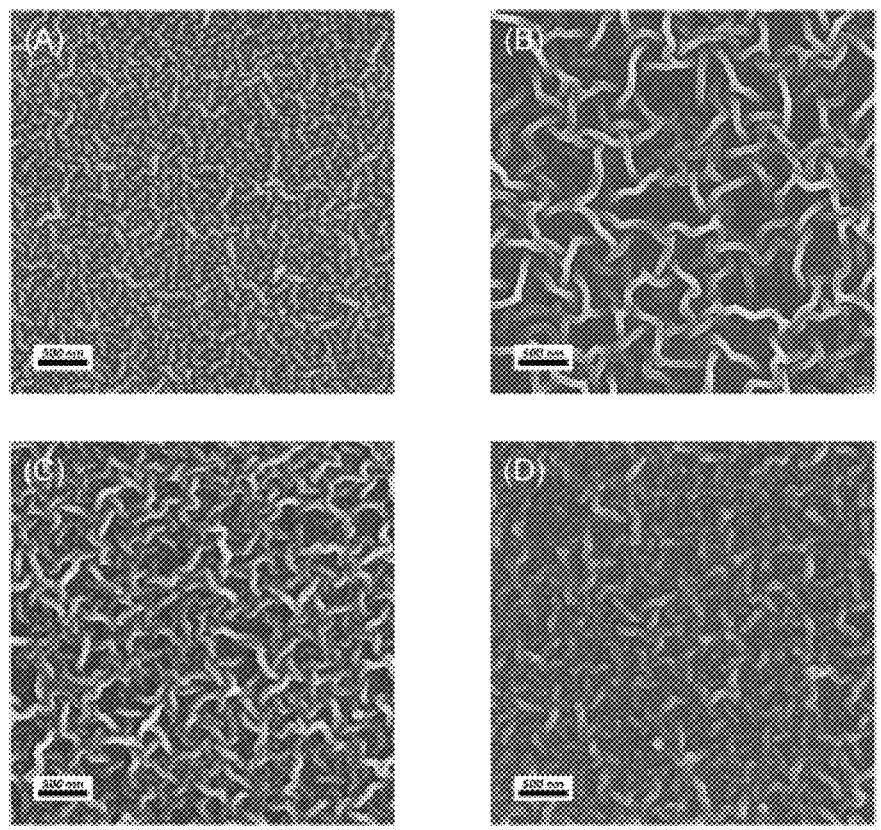
FIG. 36 is an SEM image of a polyamide membrane prepared by adding different TMC contents, [PZ]=23 mM, [PVA]=34 mM. (A) 4 mM, (B) 8 mM, (C) 11 mM, (D) 15 mM.

FIG. 28, FIG. 29 are XPS spectra of TS-I and TS-II membranes. The results show that the surface of the membrane contains carbon, nitrogen, and oxygen. The chemical environment of the carbon atoms is obtained by deconvolution of the high-resolution spectrum. Spectrum has two peaks: one is at 284.6 eV (aliphatic/aromatic CH or CC bonds), the other is at ~277.6 eV (amide O=CN and a carboxyl group O=CO group).

Example III Preparation of Polyurea Semipermeable Membrane with Turing Structure Polysulfone porous substrate with a solution A into contact for 5 after removal minutes. After staying in the atmosphere for about 60 s, it was contacted with the solution B for 60 s and then treated at 120° C. for 10 min to obtain a polyurea membrane. In particular, solution A contains: 2.0 (w/v) % of 1,3-phenylenediamine, 2.0 (w/v) % of sodium phosphate, 0.3 (w/v) % of PVA, and 0.1 (w/v) % sodium dodecylbenzenesulfonate, in particular, when the diffusion coefficient DA=1.0625×10-7 cm2·s-1; solution B contains: 0.1 (W/V) % naphthalene diisocyanate, 0.5 (w/v) % acetone, in particular, the diffusion coefficient DB=6.1378×10-6 cm2·s-1; DB/DA=57.77.

| | DB/DA | Semi-permeable membrane structure | Water permeation flux (m 3/m 2 · d) | Salt rejection(NaCl, %) | Anti-pollution performance (% flux reduction) |
|---|---|---|---|---|---|
| Example | 57.77 | Nanobubble | 1.06 | 99.0 | 21.4 |

In the present invention, Examples 1 to 10 (E1-E10) and Comparative Examples 1 to 5 (R1-R5) in Table I are positive/reverse osmosis membranes; Examples 11 to 27 and Comparative Examples 6 to 8 are nanofiltration membranes. Sodium chloride in the following examples is understood to be an equimolar ratio product of hydrochloric acid and sodium hydroxide.

On a porous substrate, the solution A and solution B interfacial polymerization reaction to obtain the semipermeable membrane; the semipermeable membrane from a solution A and the solution B in the presence of the porous substrate by a reaction of interfacial polymerization prepared; solution The raw material of A is shown in Table I, and the raw material of solution B is shown in Table II. The parameters of each system are shown in Table III, and the mass concentration (w/v) % of the corresponding substance is shown in parentheses:

TABLE I

| Example | Compound a | Polar solvent | Macromolecule | Nanoparticle | Diffusion coefficient DA (×10−5 cm 2/s) |
|---|---|---|---|---|---|
| E1 | 1,2-phenylenediamme(0.1) | water | Agarose | — | 0.021 |
| E2 | 1,3-phenylenediamme(0.2) | 30% ethanol | Carboxymethyl starch | — | 0.10 |
| E3 | 2,4-diaminotolueue(0.5) | 20% DMF | Carboxymethyl cellulose | — | 0.0873 |
| E4 | 1,4-xylylenediamine(1.0) | 10% isopropanol | Polyacrylic acid | — | 0.0794 |
| E5 | 1,3,5-triaminobenzene(1.0) | water | Polyacrylamide | — | 0.0689 |
| E6 | Ethylenediamine(2.0) | 5% acetone | Polyethylene glycol | — | 0.0122 |
| E7 | 1,4-butanediamine(2.5) | water | Polyethyleneimine | — | 0.0063 |
| E8 | Tris (2-aminoethyl)amine (3.0) | 50% ethanol | | Carbon nitride | 0.0027 |

TABLE I-continued

| Example | Compound a | Polar solvent | Macromolecule | Nanoparticle | Diffusion coefficient DA (×10−5 cm 2/s) |
|---|---|---|---|---|---|
| E9 | 1,3-diaminocyclohexane(4.0) | water | | Surface hydroxylated graphene | 0.0002 |
| E10 | Piperazine (5.0) | water | | Surface aminated carbon nanotube | 0.0001 |
| R1 | 1,2-phenylenediamine(0.1) | water | — | | 1.150 |
| R2 | 1,3-phenylenediamine(0.2) | water | — | | 1.022 |
| R3 | 2,4-diaminotolueue(0.5) | water | — | | 1.072 |
| R4 | 1,4-xylylenediamine(1.0) | Butyl acetate | — | | 1.078 |
| R5 | 1,3,5-triaminobenzene(2.0) | water | — | | 1.222 |

TABLE II

| Example | Compound b | Non-polar solvent | Additive | Diffusion coefficientDB (×10−5 cm 2/s) |
|---|---|---|---|---|
| E1 | 1,3,5-benzenetricarboxylic acid chloride (0.05) | IsoPaG | Ethylene glycol dimethyl ether(0.02) | 1.04 |
| E2 | Toluene diisocyanate (0.10) | IsoPaG | Ethylene glycol(0.05) | 1.00 |
| E3 | 2,5-di (chloroformyl)thiophene (0.20) | Cyclohexane | Acetone (0.1) | 1.14 |
| E4 | Adipyl chloride (0.50) | IsoPaG | Glycerin (0.05) | 1.24 |
| E5 | P-phenylene diisocyanate(0.50) | Toluene | Ethyl acetate (0.1) | 1.10 |
| E6 | 1,3-phthaloyl chloride(0.80) | Octane | Diglycidyl ether(0.02) | 1.22 |
| E7 | 1,4-cyclohexane diisocyanate (1.00) | Hexane | 1,4-dioxane (0.03) | 1.48 |
| E8 | Dimethyldiphenylmethane diisocyanate (1.20) | IsoPaG | Tributyl phosphate(0.05) | 1.42 |
| E9 | Polymethylene phenyl isocyanate (1.50) | IsoPaG + n-hexane (50%) | Dimethyl sulfoxide(0.02) | 1.28 |
| E10 | 1,3-adamantanedioyl chloride (2.00) | IsoPaG | N-methylpyrrolidone(0.2) | 1.00 |
| R1 | 1,3,5-benzenetricarboxylic acid chloride (0.05) | IsoPaG | Ethylene glycol dimethyl ether(0.05) | 1.04 |
| R2 | Toluene diisocyanate (0.10) | O-xylene | Ethylene glycol(0.02) | 1.00 |
| R3 | 2,5-di (chloroformyl)thiophene (0.20) | IsoPaG | Acetone (0.05) | 1.14 |
| R4 | Adipyl chloride (0.50) | IsoPaG | Glycerin (0.15) | 1.24 |
| R5 | P-phenylene diisocyanate(0.50) | IsoPaG | Ethyl acetate(0.02) | 1.10 |

TABLE III

| Example | DB/DA | Surface structure | Flux (m3/m2 · d) | Interception rate | Anti-pollution performance (flux decreased) |
|---|---|---|---|---|---|
| E1 | 50 | Tubular Turing Structure | 1.48 | 99.30% | 19.20% |
| E2 | 10.0 | Patchy Turing Structure | 1.10 | 99.10% | 19.60% |
| E3 | 13.1 | Ring-shaped Turing structure | 1.06 | 99.41% | 18.32% |
| E4 | 15.6 | Tubular Turing Structure | 1.12 | 99.15% | 18.56% |
| E5 | 16.0 | Tubular Turing Structure | 1.45 | 98.92% | 19.21% |
| E6 | 10 0 | Mixed Turing structure | 1.23 | 99.01% | 17.89% |
| E7 | 234.9 | Bubble structure | 1.00 | 98.82% | 18.74% |
| E8 | 525.9 | Bubble structure | 1.21 | 98.79% | 16.82% |
| E9 | 6400 | Bubble structure | 1.36 | 98.52% | 17.13% |

TABLE III-continued

| Example | DB/DA | Surface structure | Flux (m3/m 2 · d) | Interception rate | Anti-pollution performance (flux decreased) |
|---|---|---|---|---|---|
| E10 | 10 0 00 | Bubble structure | 1.29 | 98.12% | 17.05% |
| R1 | 0.9 | Peak-valley structure | 0.84 | 99.50% | 29.50% |
| R2 | 1.0 | Peak-valley structure | 0.77 | 99.10% | 30.20% |
| R3 | 1.1 | Peak-valley structure | 0.76 | 99.45% | 30.31% |
| R4 | 1.2 | Peak-valley structure | 0.46 | 97.20% | 35.62% |
| R5 | 0.9 | No continuous membrane | — | — | — |

Example 11

Will contain 2.0 (w/v) % of 1,3-phenylenediamine, 1.0 (w/v) % sodium phosphate, 0.5 (w/v) % of 3-aminobenzoic acid, 0.2 (w/v) % A polar solution of polyvinylpyrrolidone (average weight average molecular weight of 160,000) and 0.1 (w/v) of sodium dodecylbenzenesulfonate was coated on a polyethersulfone porous substrate and the excess solution was removed after immersion for about 120 seconds. After staying in the atmosphere for about 60 s, a non-polar organic solution containing 0.1 (w/v) % 1,3,5-benzenetricarboxylic acid chloride and 0.5 (w/v) % acetone was contacted with the coating solution. After treatment at 120° C. for 3 min, a polyamide semipermeable membrane having a nanobubble Turing structure was obtained on a polyethersulfone porous substrate.

Comparative Example 6

A polyamide semipermeable membrane was obtained in the same manner as in Example 11 except that the macromolecular auxiliary was not added to the polar solvent.

TABLE 1

| | DB/DA | Semi-permeable membrane structure | Water permeation flux (m 3/m 2 · d) | Salt rejection (NaCl, %) | Anti-pollution performance (% flux reduction) |
|---|---|---|---|---|---|
| Example 11 | 50 | Nano-bubble | 1.18 | 99.3 | 19.2 |
| Comparative Example 6 | 1 | Peak-valley structure | 0.84 | 99.5 | 29.5 |

Example 12

The polar solution consisted of 3.0 (w/v) % of 1,3-phenylenediamine, 1.0 (w/v) % of sodium chloride, 0.5 (w/v) % of isopropanol, 0.2 (w/v) % polyvinyl alcohol (average weight average molecular weight of 100,000) and 0.1 (W/V) % of cetyl trimethyl ammonium bromide, a non-polar organic solution containing 0.2 (W/V) % of 1,3,5-benzenetricarboxylic acid chloride. The interfacial polymerization process was the same as in Example 11, and a polyamide semipermeable membrane having a nanotubular Turing structure was obtained on a polysulfone porous substrate.

Example 13

The interfacial polymerization process was the same as in Example 12, in which 1.0 (w/v) % of 2-aminobenzoic acid was added to the polar solvent, and 0.5 (w/v) % of polyvinyl alcohol was used after beat treatment (average weight average Molecular weight 100,000), 0.2 (w/v) % of glutaraldehyde 0.02 (w/v) % hydrochloric acid solution was coated on the polyamide layer, and finally a polyamide having a nanotubular Turing structure was obtained on the polysulfone porous substrate.

Comparative Example 7

A polyamide semipermeable membrane was obtained in the same manner as in Example 12 except that the macromolecular auxiliary was not added to the polar solvent.

TABLE 2

| | DB/DA | Semi-permeable membrane structure | Water permeation flux (m 3/m 2, d) | Salt rejection (NaCl, %) | Anti-pollution performance (% flux reduction) |
|---|---|---|---|---|---|
| Example 12 | 100 | Nano-tubular | 1.24 | 99.5 | 19.6 |
| Example 13 | 200 | Nano-tubular | 1.32 | 99.6 | 16.7 |
| Comparative Example 7 | 1 | Peak-valley structure | 0.91 | 99.4 | 30.2 |

Example 14

The polar solution composition is 2.0 (w/v) % of 1,3-phenylenediamine, 1.0 (w/v) % of sodium hydroxide, 0.5 (w/v) of 3-aminobenzenesulfonic acid, 0.2 (w/v) % polyethyleneimine (average weight average molecular weight 70,000) and 0.1 (w/v) % sodium diisooctyl sulfosuccinate, non-polar solution containing 0.1 (w/v) % of 1,3,5-benzenetricarboxylic acid chloride and 0.5 (w/v) % ethyl acetate. The interfacial polymerization process was the same as in Example 11, and a polyamide semipermeable membrane having a nanopatular Turing structure was obtained on a polyamide-imide porous substrate.

Example 15

The interfacial polymerization process was the same as in Example 14, except that 0.1 (w/v) % polyethyleneimine (average weight average molecular weight 70,000) and 0.1 (w/v) % polyvinylpyrrolidone were added to the polar solution (average A weight average molecular weight of 160,000 is used as a macromolecular additive to obtain a polyamide semipermeable membrane having a nanopatular Turing structure on a polyethersulfone porous substrate.

Example 16

The interfacial polymerization process was the same as in Example 14. 0.2 (w/v) % polyvinyl alcohol (average weight average molecular weight 100,000) was added as a macromolecular additive to the polar solution, and 0.5 (w/v) % (3-carboxypropyl) trimethylammonium chloride was used as an auxiliary to finally obtain a polyamide semipermeable membrane having a nanopatular Turing structure on a polyethersulfone substrate.

TABLE 3

|  | DB/DA | Semi-permeable membrane structure | Water permeation flux (m3/m2d) | Salt rejection (NaCl, %) | Anti-pollution performance (% flux reduction) |
|---|---|---|---|---|---|
| Example 14 | 600 | Nano plaque | 1.08 | 99.4 | 20.6 |
| Example 15 | 647 | Nano plaque | 1.10 | 99.1 | 18.7 |
| Example 16 | 663 | Nano plaque | 1.01 | 99.2 | 19.5 |

Example 17

The polar solution consisted of 3.0 (w/v) % of 1,3-phenylenediamine, 1.0 (w/v) % of sodium carbonate, 0.5 (w/v) of dimethyl sulfoxide, and 0.2 (w/v) % polyethylene glycol (average weight average molecular weight of 100,000) and 0.1 (W/V) % of polyethylene glycol octylphenyl ether, non-polar solution contains (W/V) 0.2% of 1,3,5-Benzene tricarboxylic acid chloride. The interfacial polymerization process was the same as in Example 11, and a polyamide semipermeable membrane having a nanocyclic Turing structure was obtained on a polysulfone porous substrate.

Example 18

The composition of the solution was the same as in Example 17, except that the polyfunctional amine solution was removed after being immersed for about 60 s, and was allowed to contact with a non-polar organic solvent containing a polyfunctional acid halide after standing at room temperature for 60 s. After completion of the reaction, the mixture was treated at 100° C. for 5 min to obtain a polyamide semipermeable membrane having a nano ring-shaped Turing structure on a polyvinylidene fluoride porous substrate.

TABLE 4

|  | DB/DA | Semi-permeable membrane structure | Water permeation flux (m3/m2d) | Salt rejection (NaCl, %) | Anti-pollution performance (% flux reduction) |
|---|---|---|---|---|---|
| Example 17 | 127 | Nanoring | 1.03 | 99.3 | 18.5 |
| Example 18 | 203 | Nanoring | 1.15 | 99.0 | 19.1 |

Example 19

The process of interfacial polymerization was the same as in Example 18 except that 1.0 (w/v) % of sodium phosphate was added as an acid absorbent, 0.2 (w/v) % of polyvinylpyrrolidone (average weight average molecular weight). 160,000) as a macromolecular additive.

Example 20

The process of interfacial polymerization was the same as in Example 19, and the post-treatment process was the same as in Example 13, and a polyamide semipermeable membrane having various Turing structures was obtained on a polysulfone porous substrate.

TABLE 5

|  | DB/DA | Semi-permeable membrane structure | Water permeation flux (m3/m2d) | Salt rejection (NaCl, %) | Anti-pollution performance (% flux reduction) |
|---|---|---|---|---|---|
| Example 19 | 468 | Multiple structures | 1.01 | 99.0 | 20.3 |
| Example 20 | 500 | Multiple structures | 1.08 | 99.3 | 16.1 |

Example 21

It will contain 0.3 (w/v) % piperazine, 1.0 (w/v) % sodium phosphate, 0.2 (w/v) % polyvinylpyrrolidone (average weight average molecular weight 160,000) and 0.1 (w/v) % A polar solution of sodium dodecylbenzene sulfonate was applied to the polysulfone porous substrate and the excess solution was removed after about 2 min of immersion. A non-polar solution containing 0.2 (w/v) % 1,3,5-benzenetricarboxylic acid chloride and 0.5 (w/v) % acetone was then contacted with the coating solution. After completion of the reaction, the mixture was treated at 90° C. for 6 min to obtain a polyamide semipermeable membrane having a nanobubble Turing structure on a polysulfone porous substrate.

TABLE 6

|  | DB/DA | Semi-permeable membrane structure | Water permeation flux (m3/m2d) | Salt rejection (MgSO4 %) | Anti-pollution performance (% flux reduction) |
|---|---|---|---|---|---|
| Example 21 | 8000 | Nano-bubble | 1.36 | 98.6 | 15.4 |

The polar solution consisted of 0.2 (w/v) % piperazine, 1.0 (w/v) % sodium chloride, 0.5 (w/v) % isopropanol, 0.2 (w/v) % polyethylene. The alcohol (average weight average molecular weight 100,000) and 0.1 (w/v) % of cetyltrimethylammonium bromide were removed after being immersed on the polysulfone porous substrate for about 60 s. After staying for 60 s at room temperature, it was contacted with a non-polar solution containing 0.2 (w/v) % of 1,3,5-benzenetricarboxylic acid chloride. After the reaction was completed, it was treated at 80° C. for 12 min to obtain a polyamide semipermeable membrane having a nanobubble and a nanotubular Turing structure.

Comparative Example 3

A polyamide semipermeable membrane was obtained in the same manner as in Example 22 except that the macromolecular auxiliary was not added.

TABLE 7

| | DB/DA | Semi-permeable membrane structure | Water permeation flux (m3/m2d) | Salt rejection (MgSO4 %) | Anti-pollution performance (% flux reduction) |
|---|---|---|---|---|---|
| Example 22 | 511 | Two structures | 2.20 | 99.2 | 12.8 |
| Comparative Example 8 | 1 | Smooth and flat | 0.55 | 98.0 | 19.1 |

Example 23

The polar solution was 0.2 (w/v) % piperazine, 1.0 (w/v) % sodium hydroxide, 0.2 (w/v) % polyethyleneimine (average weight average molecular weight 70,000) and 0.1 (w/v) % sodium diisooctyl sulfosuccinate, a non-polar solution of 0.3 (w/v) % 1,3,5-benzenetricarboxylic acid chloride and 0.5 (w/v) % ethyl acetate. The interfacial polymerization process was the same as in Example 21, and a polyamide semipermeable membrane having a nanopatular Turing structure was obtained on a polyethersulfone porous substrate.

Example 24

The solution composition and the interfacial polymerization process were the same as in Example 23, except that the interfacial polymerization reaction was carried out on a polyvinylidene fluoride porous substrate to obtain a polyamide semipermeable membrane having a nanopatular Turing structure.

TABLE 8

| | DB/DA | Semi-permeable membrane structure | Water permeation flux (m3/m2d) | Salt rejection (MgSO4, %) | Anti-pollution performance (% flux reduction) |
|---|---|---|---|---|---|
| Example 23 | 311 | Nano plaque | 1.23 | 98.2 | 15.8 |
| Example 24 | 296 | Nano plaque | 1.35 | 98.0 | 14.6 |

Example 25

The polar solution consists of 0.3 (w/v) % piperazine, 1.0 (w/v) % sodium carbonate, 0.5 (w/v) % dimethyl sulfoxide, 0.2 (w/v) % polyethylene. Alcohol (average weight average molecular weight 100,000) and 0.1 (w/v) % of polyethylene glycol octylphenyl ether, and the non-polar solution was 0.3 (w/v) % of 1,3,5-benzenetricarboxylic acid chloride. The interfacial polymerization process was the same as in Example 22, and a polyamide semipermeable membrane having a nanocyclic Turing structure was obtained on a polyamide-imide porous substrate.

Example 26

The solution composition and interfacial polymerization process were the same as in Example 25, except that after heat treatment, glutaraldehyde containing 0.5 (w/v) % polyvinyl alcohol (average weight average molecular weight 100,000), 0.2 (w/v) %, 0.1 (w/v) % diglycidyl ether and 0.01 (w/v) % sulfuric acid solution were coated on the polyamide layer, and a polyamide half having a nano ring-shaped Turing structure was obtained on the polyethersulfone porous substrate.

TABLE 9

| | DB/DA | Semi-permeable membrane structure | Water permeation flux (m3/m2d) | Salt rejection (MgSO4 %) | Anti-pollution performance (% flux reduction) |
|---|---|---|---|---|---|
| Example 25 | 628 | Nanoring | 1.32 | 98.5 | 15.1 |
| Example 26 | 663 | Nanoring | 1.48 | 98.8 | 13.2 |

Example 27

The solution composition and interfacial polymerization process were the same as in Example 25, except that 0.5 (w/v) % acetone was used instead of dimethyl sulfoxide, and 0.2 (w/v) % polyvinylpyrrolidone (average weight average molecular weight 160,000) was used. Instead of polyethylene glycol. A polyamide semipermeable membrane having a plurality of Turing structures was obtained on a polysulfone porous substrate.

TABLE 10

| | DB/DA | Semi-permeable membrane structure | Water permeation flux (m3/m2d) | Salt rejection (MgSO4, %) | Anti-pollution performance (% flux reduction) |
|---|---|---|---|---|---|
| Example 27 | 507 | Multiple structures | 1.21 | 98.1 | 18.4 |

As shown in Tables 1 to 10, under the same test conditions, the Turing structure polyamide semipermeable membrane produced by the technique disclosed in the present invention has higher water permeation than the semipermeable membrane manufactured by the conventional technique. Flux and retention of salt. When there is a proteinaceous contaminant in the raw material liquid, the Turing-type polyamide semipermeable membrane has less water permeation flux attenuation, and its anti-pollution performance is superior to that of the polyamide semipermeable membrane manufactured by the conventional method.

As shown in the above examples and comparative examples, the polyamide semipermeable membrane produced by the technique disclosed in the present invention has a Turing structure and can simultaneously have high water permeation flux, high salt rejection and anti-pollution performance.

Figure 9:
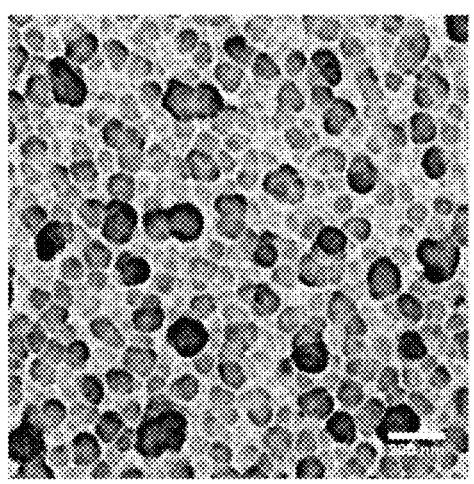
FIG. 9 is a transmission electron micrograph of a polyamide semipermeable membrane of a nanobubble structure according to Example 11 of the present invention.
Figure 10:
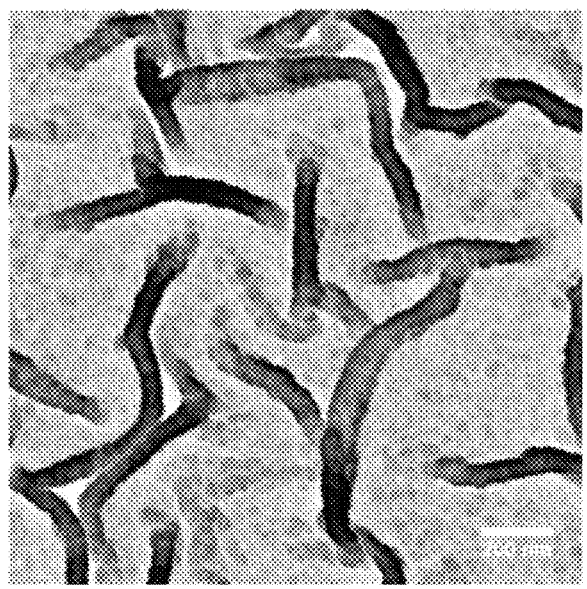
FIG. 10 is a transmission electron micrograph of a polyamide semipermeable membrane of a nanotubular structure according to Example 12 of the present invention.
Figure 11:
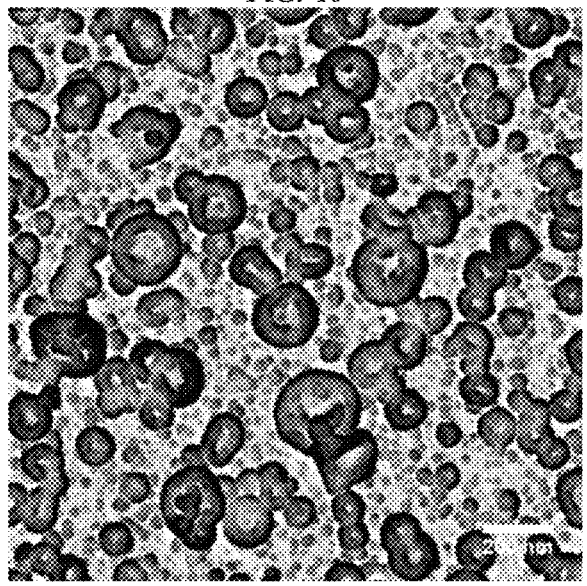
FIG. 11 is a transmission electron micrograph of a polyamide semipermeable membrane of a nanoring structure according to Example 17 of the present invention.
Figure 12:
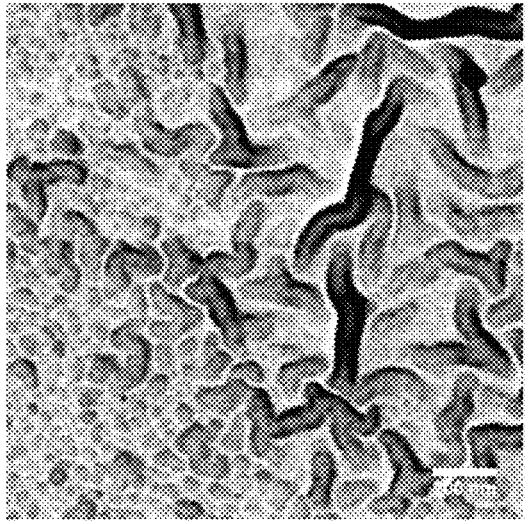
FIG. 12 is a transmission electron micrograph of a polyamide semipermeable membrane using various Turing structures in accordance with Example 27 of the present invention.
Figure 13:
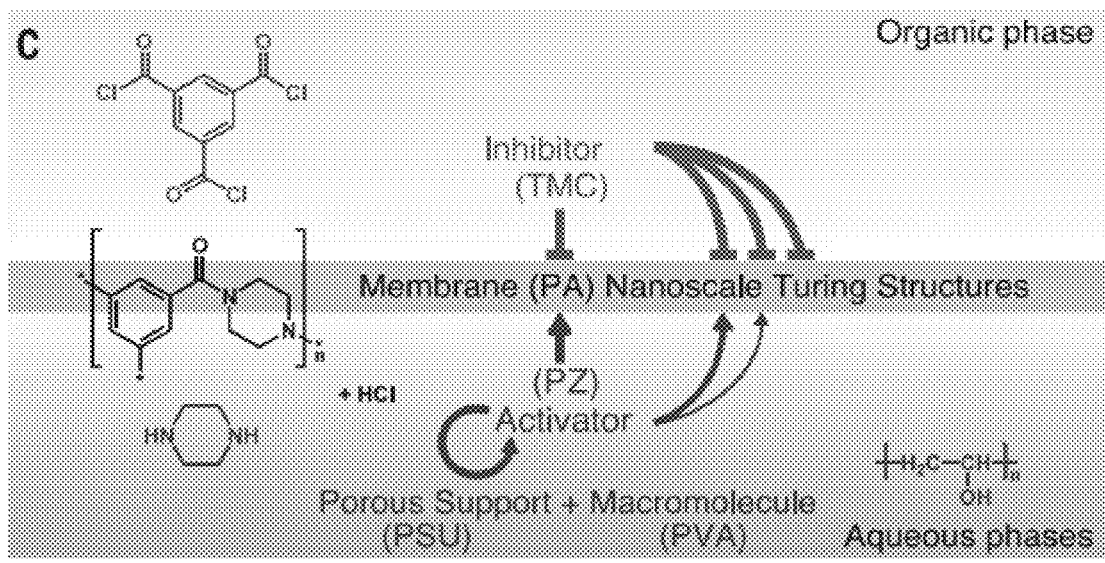
FIG. 13 is a schematic diagram of the preparation of a polyamide semipermeable membrane using piperazine (PZ) and trimesoyl chloride (TMC) as starting materials.

FIG. 8-FIG. 12, respectively Example 14, 11, 12, 17 and 27 of the semipermeable membrane corresponding TEM in FIG. As can be seen from FIG. 9, the polyamide semipermeable membrane has a nanobubble structure. As can be seen from FIG. 10, the polyamide semipermeable membrane has a nanotubular structure. As can be seen from FIG. 8, the polyamide semipermeable membrane has a nanopopular structure. As can be seen from FIG. 11, the polyamide semipermeable membrane has a nanoring structure. As can be seen from FIG. 12, the polyamide semipermeable membrane has a plurality of Turing structures.

In the various embodiments given herein, the features described as "preferred" or "in some embodiments" or "preferably" are not to be construed as being required, essential or critical to the invention.

The invention claimed is:

1. A method for preparing a semipermeable membrane, comprising the following steps:
preparing the semipermeable membrane by an interfacial polymerization of a solution A and a solution B in the presence of a porous substrate;
wherein the solution A comprises a compound a and a polar solvent, and the compound a contains amino groups and/or imino groups;
the solution B comprises a compound b and a non-polar solvent, and the compound b contains acid halide groups and/or isocyanate groups;
a diffusion coefficient $D_A$ of the compound a in the solution A and a diffusion coefficient $D_B$ of the compound b in the solution B satisfy the following condition: $D_B/D_A \geq 10$.

2. The method according to claim 1, further comprises the following steps:
S1. coating a surface of the porous substrate with the solution A to form a liquid film on the surface of the porous substrate;
S2. bringing the liquid film in step S1 into contact with the solution B, and forming a separation layer by the interfacial polymerization to obtain the semipermeable membrane.

3. The method according to claim 2, wherein in the step S1, a liquid membrane residence time is 10~600s; and/or, in the step S2, a reaction time of the interfacial polymerization is 10~600s.

4. The method according to claim 1, wherein the diffusion coefficient $D_A$ of the compound a in the solution A and the diffusion coefficient $D_B$ of the compound b in the solution B satisfy the following conditions: $10 \leq D_B/D_A \leq 10^5$.

5. The method according to claim 1, wherein the compound a has a molecular formula:
R(NHx)n,
wherein $1 \leq x \leq 2$, $2 \leq n \leq 3$, and R comprises one or more from the group consisting of aromatic ring, alicyclic ring, aromatic heterocyclic ring, heterocyclic ring, and carbon chain;
wherein the concentration the compound a in the solution A is 0.1~5.0 (w/v) %.

6. The method according to claim 1, wherein the compound b is a polyisocyanate and/or a third compound containing at least two acid halide groups.

7. The method according to claim 6, wherein the polyisocyanate comprises one or more from the group consisting of toluene diisocyanate, diphenylmethane diisocyanate, hexamethylene diisocyanate, 1,4-phenylene diisocyanate, isophorone diisocyanate, methylene-bis(4-cyclohexyl isocyanate), naphthalene diisocyanate, 1, 4-cyclohexane diisocyanate, xylyl diisocyanate, bis(isocyanatomethyl)-cyclohexane, lysine diisocyanate, dimethyl diphenylmethane diisocyanate, methyl cyclohexyl diisocyanate, polymethylene phenyl isocyanate, and their oligomers thereof;
the third compound containing at least two acid halide groups has a molecular formula:
R(COX) n,
wherein, $2 \leq n \leq 4$, and X comprises one from the group consisting of halogens, and R comprises at least one or more from the group consisting of aromatic ring, alicyclic ring, heteroaromatic ring, heterocyclic ring, and carbon chain; wherein the compound b comprises at least one or more from the group consisting of 1,3,5-benzenetricarboxylic acid chloride, 1,4-phthaloyl dichloride, 1,3-phthaloyl dichloride, 2,6-pyridine dicarboxylic acid chloride, 2,5-thiophenedicarbonyl dichloride, 2,5-furandicarbonyl dichloride, 4,4'-biphenyldicarbonyl chloride, glutaryl chloride, adipoyl chloride, heptanedioyl dichloride, suberoyl chloride, azelaoyl chloride, sebacoyl chloride, cyclohexyl-1,4-dicarbonyl chloride, and 1,3-adamantanedicarbonyl dichloride.

8. The method according to claim 1, wherein the polar solvent comprises at least one or more from the group consisting of water, dimethylformamide, dimethylacetamide, alcohols, ketones, and esters.

9. The method according to claim 1, wherein the non-polar solvent comprises at least one or more from the group consisting of $C_6$-$C_{14}$ isoparaffin mixture cycloalkanes, and aromatic hydrocarbons.

10. The method according to claim 1, the solution A further comprises a first material which reduces the diffusion coefficient $D_A$ of the compound a in the solution A; wherein the first material comprises at least one or more from the group consisting of macromolecules and nanoparticles.

11. The method according to claim 10, wherein at least one of that macromolecule is capable of forming an intermolecular hydrogen bond and/or an intramolecular hydrogen bond to reduce the diffusion coefficient $D_A$ of the compound a in solution A.

12. The method according to claim 10, wherein the concentration of the macromolecules in the solution A is 0.01~0.05 (w/v) %.

13. The method according to claim 10, wherein the nanoparticles are organic or inorganic substances, and the nanoparticles comprise at least one or more from the group consisting of surface hydroxylated nanotubes, graphene, carbon nitride; surface carboxylated nanotubes, graphene, carbon nitride, surface aminated nanotubes, graphene, and carbon nitride.

14. The method according to claim 1, the solution A further comprises at least one first additive from the group consisting of catalyst, surfactant, zwitterionic compound, acid, and base.

15. The method according to claim 1, the solution B further comprises at least one second additive from the group consisting of cosolvent, complexing agent, and phase transfer agent.

16. A membrane module, comprising a semipermeable membrane prepared by the method of claim 1.

* * * * *